US012708906B2

(12) United States Patent
Yang et al.

(10) Patent No.: US 12,708,906 B2
(45) Date of Patent: Aug. 18, 2026

(54) PAPER SHREDDING TRASHCAN

(71) Applicant: simplehuman, LLC, Torrance, CA (US)

(72) Inventors: Frank Yang, Rancho Palos Verdes, CA (US); Cory Bowman, Mission Viejo, CA (US); Myk Lum, Irvine, CA (US); Adam Wade, Rancho Santa Margarita, CA (US); Yoon Kim, Long Beach, CA (US); Nasser Pirshafiey, Trabuco Canyon, CA (US); Chris Doran, Rancho Santa Margarita, CA (US)

(73) Assignee: simplehuman, LLC, Torrance, CA (US)

( * ) Notice: Subject to any disclaimer, the term of this patent is extended or adjusted under 35 U.S.C. 154(b) by 283 days.

(21) Appl. No.: 18/311,610

(22) Filed: May 3, 2023

(65) Prior Publication Data

US 2023/0356235 A1 Nov. 9, 2023

Related U.S. Application Data

(60) Provisional application No. 63/488,383, filed on Mar. 3, 2023, provisional application No. 63/364,316, filed on May 6, 2022.

(51) Int. Cl.
*B02C 18/00* (2006.01)
*B65F 1/00* (2006.01)
*B65F 1/16* (2006.01)

(52) U.S. Cl.
CPC ........ *B02C 18/0007* (2013.01); *B65F 1/1646* (2013.01)

(58) Field of Classification Search
CPC ......... B02C 18/0007; B02C 2018/0046; B65F 1/1646; B65F 1/004; B65F 2210/169; B65F 2240/1562
See application file for complete search history.

(56) References Cited

U.S. PATENT DOCUMENTS 830,182 A 9/1906 Skov
1,379,677 A 5/1921 Edward
(Continued)

FOREIGN PATENT DOCUMENTS

AU 622536 4/1992
BR 202013004348-1 11/2014
(Continued)

OTHER PUBLICATIONS

U.S. Appl. No. 29/484,903, filed Mar. 13, 2014, Yang et al.
(Continued)

*Primary Examiner* — Mohammed S. Alawadi
(74) *Attorney, Agent, or Firm* — Knobbe, Martens, Olson & Bear, LLP

(57) ABSTRACT

The present disclosure describes a paper shredder having a shredder, a first receptacle, a housing, a magnet, and a hook assembly. The first receptacle can be positioned below the shredder. The housing can comprise a front wall, a rear wall, lateral side walls connecting the front and rear wall, and a base. The housing can be configured to enclose the shredder and the receptacle. The magnet can be positioned in the base of the housing. The hook assembly can be coupled to an upper portion of the rear wall of the housing. The hook assembly can comprise a body extending along at least a portion of the rear wall of the housing and a hook coupled to a first end of the body. The base and the receptacle can be removable from the paper shredder.

15 Claims, 17 Drawing Sheets

(56) References Cited

U.S. PATENT DOCUMENTS

| | | | |
|---|---|---|---|
| 1,426,211 | A | 8/1922 | Pausin |
| 1,461,253 | A | 7/1923 | Owen |
| 1,754,802 | A | 4/1930 | Raster |
| 1,820,555 | A | 8/1931 | Buschman |
| 1,891,651 | A | 12/1932 | Padelford et al. |
| 1,922,729 | A | 8/1933 | Geibel |
| 1,980,938 | A | 11/1934 | Geibel |
| 2,308,326 | A | 1/1943 | Ambrose |
| D148,825 | S | 2/1948 | Snider |
| 2,457,274 | A | 12/1948 | Rifken |
| 2,591,104 | A | 4/1952 | Stone |
| 2,593,455 | A | 4/1952 | James |
| 2,699,368 | A | 1/1955 | Alois |
| 2,759,625 | A | 8/1956 | Ritter |
| 2,796,309 | A | 6/1957 | Taylor |
| 2,888,307 | A | 5/1959 | Graves et al. |
| 2,946,474 | A | 7/1960 | Knapp |
| 3,008,604 | A | 11/1961 | Garner |
| 3,023,922 | A | 3/1962 | Arrington et al. |
| 3,137,408 | A | 6/1964 | Taylor |
| 3,180,384 | A | 4/1965 | Seifert |
| 3,261,545 | A | 7/1966 | Frazier |
| 3,300,082 | A | 1/1967 | Patterson |
| 3,392,825 | A | 7/1968 | Gale et al. |
| 3,450,297 | A | 6/1969 | Clerk |
| 3,451,453 | A | 6/1969 | Heck |
| 3,618,814 | A | 11/1971 | Nagroski |
| 3,654,534 | A | 4/1972 | Fischer |
| 3,800,503 | A | 4/1974 | Maki |
| 3,820,200 | A | 6/1974 | Myers |
| 3,825,150 | A | 7/1974 | Taylor |
| 3,825,215 | A | 7/1974 | Borglum |
| 3,870,261 | A | 3/1975 | McSwain |
| 3,886,425 | A | 5/1975 | Weiss |
| 3,888,406 | A | 6/1975 | Nippes |
| 3,891,115 | A | 6/1975 | Ono |
| 3,893,615 | A | 7/1975 | Johnson |
| 3,964,630 | A | 6/1976 | Getz |
| 4,014,457 | A | 3/1977 | Hodge |
| 4,027,774 | A | 6/1977 | Cote |
| 4,081,105 | A | 3/1978 | Dagonnet et al. |
| 4,189,808 | A | 2/1980 | Brown |
| 4,200,197 | A | 4/1980 | Meyer et al. |
| 4,217,616 | A | 8/1980 | Jessup |
| 4,223,858 | A | 9/1980 | De Salazar |
| 4,303,174 | A | 12/1981 | Anderson |
| 4,320,851 | A | 3/1982 | Montoya |
| 4,349,123 | A | 9/1982 | Yang |
| 4,357,740 | A | 11/1982 | Brown |
| 4,416,197 | A | 11/1983 | Kehl |
| 4,417,669 | A | 11/1983 | Knowles et al. |
| 4,457,483 | A | 7/1984 | Gagne |
| 4,535,911 | A | 8/1985 | Goulter |
| 4,570,304 | A | 2/1986 | Montreuil et al. |
| 4,576,310 | A | 3/1986 | Isgar et al. |
| D284,320 | S | 6/1986 | Kubic et al. |
| 4,609,117 | A | 9/1986 | Pamment |
| 4,630,332 | A | 12/1986 | Bisbing |
| 4,630,752 | A | 12/1986 | DeMars |
| 4,664,347 | A | 5/1987 | Brown et al. |
| 4,697,312 | A | 10/1987 | Freyer |
| 4,711,161 | A | 12/1987 | Swin et al. |
| 4,729,490 | A | 3/1988 | Ziegenbein |
| 4,753,367 | A | 6/1988 | Miller et al. |
| 4,763,808 | A | 8/1988 | Guhl et al. |
| 4,765,548 | A | 8/1988 | Sing |
| 4,765,579 | A | 8/1988 | Robbins, III et al. |
| 4,785,964 | A | 11/1988 | Miller et al. |
| 4,792,039 | A | 12/1988 | Dayton |
| 4,794,973 | A | 1/1989 | Perisic |
| 4,813,592 | A | 3/1989 | Stolzman |
| 4,823,979 | A | 4/1989 | Clark, Jr. |
| 4,834,260 | A | 5/1989 | Auten |
| 4,863,053 | A | 9/1989 | Oberg |
| 4,867,339 | A | 9/1989 | Hahn |
| 4,869,391 | A | 9/1989 | Farrington |
| 4,884,717 | A | 12/1989 | Bussard et al. |
| 4,888,532 | A | 12/1989 | Josson |
| 4,892,223 | A | 1/1990 | DeMent |
| 4,892,224 | A | 1/1990 | Graham |
| D307,344 | S | 4/1990 | Massonnet |
| 4,913,308 | A | 4/1990 | Culbertson |
| 4,915,347 | A | 4/1990 | Iqbal et al. |
| 4,918,568 | A | 4/1990 | Stone et al. |
| D308,272 | S | 5/1990 | Koepsell |
| 4,923,087 | A | 5/1990 | Burrows |
| 4,944,419 | A | 7/1990 | Chandler |
| 4,948,004 | A | 8/1990 | Chich |
| 4,953,740 | A | 9/1990 | Koda |
| 4,964,523 | A | 10/1990 | Bieltvedt et al. |
| 4,972,966 | A | 11/1990 | Craft, Jr. |
| 4,996,467 | A | 2/1991 | Day |
| 5,031,793 | A | 7/1991 | Chen et al. |
| 5,048,903 | A | 9/1991 | Loblein |
| 5,054,724 | A | 10/1991 | Hutcheson |
| 5,065,272 | A | 11/1991 | Owen et al. |
| 5,065,891 | A | 11/1991 | Casey |
| D322,350 | S | 12/1991 | Craft, Jr. et al. |
| 5,072,852 | A | 12/1991 | Smith et al. |
| 5,076,462 | A | 12/1991 | Perrone |
| D323,573 | S | 1/1992 | Schneider |
| 5,090,585 | A | 2/1992 | Power |
| 5,090,785 | A | 2/1992 | Stamp |
| 5,100,087 | A | 3/1992 | Ashby |
| 5,111,958 | A | 5/1992 | Witthoeft |
| 5,125,526 | A | 6/1992 | Sumanis |
| D327,760 | S | 7/1992 | Donnelly |
| D329,929 | S | 9/1992 | Knoedler et al. |
| 5,147,055 | A | 9/1992 | Samson et al. |
| 5,156,290 | A | 10/1992 | Rodrigues |
| D331,097 | S | 11/1992 | Sieren |
| 5,170,904 | A | 12/1992 | Neuhaus |
| 5,174,462 | A | 12/1992 | Hames |
| D332,852 | S | 1/1993 | Delmerico |
| 5,199,571 | A | 4/1993 | Wolff et al. |
| D335,562 | S | 5/1993 | Evans |
| 5,213,272 | A | 5/1993 | Gallagher et al. |
| 5,222,704 | A | 6/1993 | Light |
| D337,181 | S | 7/1993 | Warman |
| 5,226,558 | A | 7/1993 | Whitney et al. |
| 5,230,525 | A | 7/1993 | Delmerico et al. |
| 5,242,074 | A | 9/1993 | Conaway et al. |
| D340,333 | S | 10/1993 | Duran et al. |
| 5,249,693 | A | 10/1993 | Gillispie et al. |
| 5,261,553 | A | 11/1993 | Mueller et al. |
| 5,265,511 | A | 11/1993 | Itzov |
| 5,295,607 | A | 3/1994 | Chang |
| 5,305,916 | A | 4/1994 | Suzuki et al. |
| 5,314,151 | A | 5/1994 | Carter-Mann |
| 5,322,179 | A | 6/1994 | Ting |
| 5,329,212 | A | 7/1994 | Feigleson |
| 5,337,581 | A | 8/1994 | Lott |
| 5,348,222 | A | 9/1994 | Patey |
| 5,353,950 | A | 10/1994 | Taylor et al. |
| 5,372,272 | A | 12/1994 | Jennings |
| 5,381,588 | A | 1/1995 | Nelson |
| 5,385,258 | A | 1/1995 | Sutherlin |
| 5,390,818 | A | 2/1995 | LaBuda |
| 5,391,423 | A | 2/1995 | Wnuk et al. |
| 5,404,621 | A | 4/1995 | Heinke |
| 5,407,089 | A | 4/1995 | Bird et al. |
| 5,419,452 | A | 5/1995 | Mueller et al. |
| 5,471,708 | A | 12/1995 | Lynch |
| 5,474,201 | A | 12/1995 | Liu |
| 5,476,187 | A | 12/1995 | Marisco |
| 5,501,358 | A | 3/1996 | Hobday |
| D368,563 | S | 4/1996 | Brightbill et al. |
| 5,520,067 | A | 5/1996 | Gaba |
| 5,520,303 | A | 5/1996 | Bernstein et al. |
| 5,531,348 | A | 7/1996 | Baker et al. |
| 5,535,913 | A | 7/1996 | Asbach et al. |
| 5,558,254 | A | 9/1996 | Anderson et al. |
| 5,560,283 | A | 10/1996 | Hannig |
| 5,584,412 | A | 12/1996 | Wang |

(56) References Cited

U.S. PATENT DOCUMENTS

D377,554 S 1/1997 Adriaansen
5,611,507 A 3/1997 Smith
5,628,424 A 5/1997 Gola
5,632,401 A 5/1997 Hurd
5,636,416 A 6/1997 Anderson
5,636,761 A 6/1997 Diamond et al.
5,641,090 A 6/1997 Kowalski et al.
5,644,111 A 7/1997 Cerny et al.
5,645,186 A 7/1997 Powers et al.
5,650,680 A 7/1997 Chula
D383,277 S 9/1997 Peters
5,662,235 A 9/1997 Nieto
5,671,847 A 9/1997 Pedersen et al.
5,690,247 A 11/1997 Boover
5,695,088 A 12/1997 Kasbohm
5,699,929 A 12/1997 Ouno
D388,922 S 1/1998 Peters
D389,631 S 1/1998 Peters
5,704,511 A 1/1998 Kellams
5,724,837 A 3/1998 Shin
5,730,312 A 3/1998 Hung
5,732,845 A 3/1998 Armaly, Jr.
5,735,495 A 4/1998 Kubota
5,738,239 A 4/1998 Triglia
5,770,935 A 6/1998 Smith et al.
5,799,909 A 9/1998 Ziegler
5,816,431 A 10/1998 Giannopoulos
5,816,640 A 10/1998 Nishimura
D401,028 S 11/1998 Ahern, Jr. et al.
D401,383 S 11/1998 Gish
D401,719 S 11/1998 Van Leeuwen et al.
5,873,643 A 2/1999 Burgess, Jr. et al.
5,881,896 A 3/1999 Presnell et al.
5,881,901 A 3/1999 Hampton
5,884,237 A 3/1999 Kanki et al.
5,887,748 A 3/1999 Nguyen
D412,552 S 8/1999 Burrows
5,961,105 A 10/1999 Ehrnsberger et al.
5,967,355 A 10/1999 Ragot
5,967,392 A 10/1999 Niemi et al.
5,987,708 A 11/1999 Newton
5,988,542 A 11/1999 Henreckson et al.
6,000,569 A 12/1999 Liu
6,010,024 A 1/2000 Wang
D420,182 S 2/2000 Roudebush
6,024,238 A 2/2000 Jaros
D422,123 S 3/2000 Roudebush
6,036,050 A 3/2000 Ruane
6,062,389 A 5/2000 Kent
6,079,645 A * 6/2000 Henreckson ........ B02C 18/0007
241/37.5
6,091,064 A 7/2000 Eaton et al.
6,102,239 A 8/2000 Wien
6,105,859 A 8/2000 Stafford
6,123,215 A 9/2000 Windle
D431,700 S 10/2000 Roudebush
D431,888 S 10/2000 Roudebush
6,126,031 A 10/2000 Reason
6,129,233 A 10/2000 Schiller
6,131,861 A 10/2000 Fortier, Jr. et al.
D435,951 S 1/2001 Yang et al.
6,176,455 B1 1/2001 Ma
6,209,744 B1 4/2001 Gill
6,211,637 B1 4/2001 Studer
6,234,339 B1 5/2001 Thomas
6,250,492 B1 6/2001 Verbeek
D445,980 S 7/2001 Tjugum
6,286,706 B1 9/2001 Tucker
6,328,320 B1 12/2001 Walski et al.
6,345,725 B1 2/2002 Lin
6,364,147 B1 4/2002 Meinzinger et al.
6,386,386 B1 5/2002 George
6,390,321 B1 5/2002 Wang
6,401,958 B1 6/2002 Foss et al.
D466,667 S 12/2002 Lin
6,519,130 B1 2/2003 Breslow
6,557,716 B1 5/2003 Chan
D476,456 S 6/2003 Englert et al.
D476,457 S 6/2003 Verbeek
6,581,796 B1 6/2003 Pilkinton
6,596,983 B2 7/2003 Brent
D480,193 S 9/2003 Wang
6,612,099 B2 9/2003 Stravitz
6,626,316 B2 9/2003 Yang
6,626,317 B2 9/2003 Pfiefer et al.
D481,508 S 10/2003 Wang
6,632,064 B1 10/2003 Walker et al.
D481,846 S 11/2003 Lin
D482,169 S 11/2003 Lin
6,659,407 B2 12/2003 Asaro
6,681,950 B2 1/2004 Miller, Jr. et al.
6,701,832 B1 3/2004 Hawkins
D488,604 S 4/2004 Yang et al.
D488,903 S 4/2004 Yang et al.
D489,503 S 5/2004 Lin
D489,855 S 5/2004 Tseng
D489,857 S 5/2004 Yang et al.
D490,583 S 5/2004 Yang et al.
6,739,474 B1 5/2004 Wang
D490,954 S 6/2004 Brand
D491,706 S 6/2004 Yang et al.
6,758,366 B2 7/2004 Bourgund et al.
D493,930 S 8/2004 Wang
D494,723 S 8/2004 Lin
6,774,586 B1 8/2004 Shih
6,785,912 B1 9/2004 Julio
6,812,655 B1 11/2004 Wang et al.
6,814,249 B2 11/2004 Lin
D499,450 S 12/2004 Goodman et al.
6,837,393 B1 1/2005 Kuo
6,857,538 B2 2/2005 Lin
6,859,005 B2 2/2005 Boliver
D503,021 S 3/2005 Yang et al.
D503,022 S 3/2005 Lai
D503,502 S 3/2005 Lai
6,866,826 B2 3/2005 Moore et al.
6,883,676 B2 4/2005 Lin
D507,090 S 7/2005 Yang et al.
6,920,994 B2 7/2005 Lin
D509,339 S 9/2005 Lin
6,974,948 B1 12/2005 Brent
D513,445 S 1/2006 Lin
6,981,606 B2 1/2006 Yang et al.
D517,763 S 3/2006 Daams
D517,764 S 3/2006 Wang
D517,767 S 3/2006 Yang et al.
D518,266 S 3/2006 Yang et al.
7,017,773 B2 3/2006 Gruber et al.
7,033,039 B2 4/2006 Lin
D522,203 S 5/2006 Lin
D522,204 S 5/2006 Lin
7,044,323 B2 5/2006 Yang
D522,704 S 6/2006 Lin
D524,504 S 7/2006 Lin
D525,756 S 7/2006 Yang et al.
7,073,677 B2 7/2006 Richardson et al.
7,077,283 B2 7/2006 Yang et al.
7,080,750 B2 7/2006 Wein et al.
D526,457 S 8/2006 Lin
D526,458 S 8/2006 Lin
D526,756 S 8/2006 Lin
7,086,550 B2 8/2006 Yang et al.
D528,726 S 9/2006 Lin
D530,476 S 10/2006 Lin
D530,874 S 10/2006 Lin
7,121,421 B2 10/2006 Yang et al.
D531,499 S 11/2006 Zaidman
D535,450 S 1/2007 Chen
D535,799 S 1/2007 Epps
D535,800 S 1/2007 Yang et al.
7,163,591 B2 1/2007 Kim et al.
7,168,591 B1 1/2007 Miller
D537,223 S 2/2007 Lin
D537,597 S 2/2007 Bolden

(56) References Cited

U.S. PATENT DOCUMENTS

| | | | |
|---|---|---|---|
| D537,599 | S | 2/2007 | Lin |
| D537,601 | S | 2/2007 | Lin |
| D537,999 | S | 3/2007 | Lin |
| D538,995 | S | 3/2007 | Lin |
| D539,498 | S | 3/2007 | Yang et al. |
| D539,499 | S | 3/2007 | Yang et al. |
| D540,001 | S | 4/2007 | Zimmerman |
| 7,204,441 | B1 | 4/2007 | Hartnett et al. |
| D542,001 | S | 5/2007 | Yang et al. |
| D542,995 | S | 5/2007 | Lin |
| D543,673 | S | 5/2007 | Yang et al. |
| D544,170 | S | 6/2007 | Lin |
| D544,171 | S | 6/2007 | Lin |
| D544,671 | S | 6/2007 | Saunders et al. |
| D545,024 | S | 6/2007 | Liao |
| 7,225,943 | B2 | 6/2007 | Yang et al. |
| D547,020 | S | 7/2007 | Chen |
| 7,243,811 | B1 | 7/2007 | Ramsey |
| D550,918 | S | 9/2007 | Wang et al. |
| D552,319 | S | 10/2007 | Gusdorf |
| D552,321 | S | 10/2007 | Yang et al. |
| D552,823 | S | 10/2007 | Yang et al. |
| D552,824 | S | 10/2007 | Zimmerman |
| D552,825 | S | 10/2007 | Yang et al. |
| D555,320 | S | 11/2007 | Yang et al. |
| D557,869 | S | 12/2007 | Hawker et al. |
| D559,494 | S | 1/2008 | Yang et al. |
| D559,495 | S | 1/2008 | Yang et al. |
| D562,522 | S | 2/2008 | Daams |
| 7,328,842 | B2 | 2/2008 | Wagner et al. |
| D564,169 | S | 3/2008 | Wang |
| D564,723 | S | 3/2008 | Yang et al. |
| D566,367 | S | 4/2008 | Lin |
| D566,369 | S | 4/2008 | Shek |
| D566,923 | S | 4/2008 | Lin |
| D567,468 | S | 4/2008 | Yang et al. |
| D568,570 | S | 5/2008 | Lin |
| D568,572 | S | 5/2008 | Yang et al. |
| D569,720 | S | 5/2008 | Lablaine |
| 7,370,919 | B2 | 5/2008 | Rapier, III |
| 7,374,060 | B2 | 5/2008 | Yang et al. |
| D571,520 | S | 6/2008 | Lin |
| D574,119 | S | 7/2008 | Sofy |
| 7,395,990 | B1 | 7/2008 | Stevens |
| 7,398,913 | B2 | 7/2008 | McClure |
| 7,404,499 | B1 | 7/2008 | Ramsey |
| D574,569 | S | 8/2008 | Yang et al. |
| D575,860 | S | 8/2008 | Wu |
| 7,416,093 | B2 | 8/2008 | Lin et al. |
| D576,371 | S | 9/2008 | Zimmerman |
| D578,265 | S | 10/2008 | Presnell |
| D578,266 | S | 10/2008 | Yang et al. |
| D578,268 | S | 10/2008 | Yang et al. |
| D578,722 | S | 10/2008 | Yang et al. |
| 7,438,199 | B1 | 10/2008 | Tidrick |
| D580,120 | S | 11/2008 | Lin |
| D580,613 | S | 11/2008 | Yang et al. |
| D580,615 | S | 11/2008 | Yang et al. |
| D581,622 | S | 11/2008 | Presnell et al. |
| D582,121 | S | 12/2008 | Wang et al. |
| D584,470 | S | 1/2009 | Bizzell et al. |
| D585,171 | S | 1/2009 | Bizzell et al. |
| D585,172 | S | 1/2009 | Lin |
| D585,618 | S | 1/2009 | Yang et al. |
| D586,065 | S | 2/2009 | Lin |
| D586,066 | S | 2/2009 | Lin |
| D586,069 | S | 2/2009 | Lin |
| D586,070 | S | 2/2009 | Lin |
| 7,494,021 | B2 | 2/2009 | Yang et al. |
| D587,874 | S | 3/2009 | Lin |
| D588,321 | S | 3/2009 | Schoofs |
| D589,670 | S | 3/2009 | Smeets |
| D593,271 | S | 5/2009 | Yang et al. |
| 7,530,578 | B2 | 5/2009 | Niemeyer et al. |
| 7,540,396 | B2 | 6/2009 | Yang et al. |
| 7,543,716 | B2 | 6/2009 | Lin |
| D596,820 | S | 7/2009 | Yang et al. |
| 7,559,433 | B2 | 7/2009 | Yang et al. |
| D599,074 | S | 8/2009 | Bizzell et al. |
| D599,971 | S | 9/2009 | Lin |
| D603,119 | S | 10/2009 | Yang et al. |
| 7,602,135 | B2 | 10/2009 | Huber et al. |
| 7,607,552 | B2 | 10/2009 | Efstathiou |
| D604,472 | S | 11/2009 | Blanks et al. |
| 7,614,519 | B2 | 11/2009 | Krauth et al. |
| 7,621,420 | B2 | 11/2009 | Bandoh et al. |
| 7,633,258 | B2 | 12/2009 | Huber et al. |
| D608,069 | S | 1/2010 | Schoofs |
| 7,656,109 | B2 | 2/2010 | Yang et al. |
| D611,216 | S | 3/2010 | Yang et al. |
| D611,217 | S | 3/2010 | Bizzell et al. |
| D611,671 | S | 3/2010 | Yang et al. |
| 7,694,838 | B2 | 4/2010 | Yang et al. |
| 7,703,622 | B1 | 4/2010 | Bynoe |
| D615,270 | S | 5/2010 | Yang et al. |
| D615,722 | S | 5/2010 | Yang et al. |
| 7,712,285 | B2 | 5/2010 | Stravitz et al. |
| 7,731,112 | B2 | 6/2010 | Matlin et al. |
| 7,741,801 | B2 | 6/2010 | Fukuizumi |
| 7,748,556 | B2 | 7/2010 | Yang et al. |
| 7,774,202 | B2 | 8/2010 | Spengler et al. |
| 7,781,995 | B2 | 8/2010 | Yang et al. |
| D623,817 | S | 9/2010 | Yang et al. |
| D625,068 | S | 10/2010 | Shannon |
| 7,806,285 | B2 | 10/2010 | Yang et al. |
| D627,533 | S | 11/2010 | Yang et al. |
| D627,944 | S | 11/2010 | Wang et al. |
| D629,172 | S | 12/2010 | Liao |
| D629,579 | S | 12/2010 | Lin |
| D630,404 | S | 1/2011 | Yang et al. |
| D631,221 | S | 1/2011 | Yang et al. |
| D632,039 | S | 2/2011 | Yang et al. |
| D632,864 | S | 2/2011 | Yang et al. |
| 7,888,898 | B2 | 2/2011 | Wilkerson |
| D634,911 | S | 3/2011 | Yang et al. |
| D635,319 | S | 3/2011 | Meyerhoffer |
| 7,896,187 | B2 | 3/2011 | Haibel |
| 7,906,921 | B2 | 3/2011 | Wang et al. |
| 7,922,024 | B2 | 4/2011 | Yang et al. |
| 7,950,543 | B2 | 5/2011 | Yang et al. |
| D639,520 | S | 6/2011 | Lin |
| D644,390 | S | 8/2011 | Smeets et al. |
| 7,992,742 | B1 | 8/2011 | Kim |
| 8,006,857 | B2 | 8/2011 | Lin |
| D644,806 | S | 9/2011 | Yang et al. |
| D644,807 | S | 9/2011 | Yang et al. |
| D649,728 | S | 11/2011 | Campbell |
| 8,074,833 | B2 | 12/2011 | Yang et al. |
| 8,096,445 | B2 | 1/2012 | Yang et al. |
| D655,061 | S | 2/2012 | Scaturro |
| 8,136,688 | B2 | 3/2012 | Lee et al. |
| D657,108 | S | 4/2012 | Yang et al. |
| D657,109 | S | 4/2012 | Liao |
| D658,753 | S | 5/2012 | Zhang et al. |
| 8,297,470 | B2 | 10/2012 | Yang et al. |
| 8,317,055 | B2 | 11/2012 | Zawrotny et al. |
| D672,520 | S | 12/2012 | Yang et al. |
| D673,750 | S | 1/2013 | Quan |
| D675,802 | S | 2/2013 | Yang et al. |
| D675,803 | S | 2/2013 | Yang et al. |
| 8,393,489 | B1 | 3/2013 | Stravitz |
| 8,418,869 | B2 | 4/2013 | Yang et al. |
| D684,741 | S | 6/2013 | Harris |
| 8,456,120 | B2 | 6/2013 | Wang |
| D689,255 | S | 9/2013 | Sun Ting Kung et al. |
| 8,567,630 | B2 | 10/2013 | Yang et al. |
| 8,569,980 | B2 | 10/2013 | Yang et al. |
| D694,382 | S | 11/2013 | Brandenburg et al. |
| 8,575,537 | B2 | 11/2013 | Yao et al. |
| 8,607,932 | B2 | 12/2013 | Cooper et al. |
| 8,672,171 | B2 | 3/2014 | Wynn et al. |
| 8,678,219 | B1 | 3/2014 | Wang et al. |
| 8,686,676 | B2 | 4/2014 | Yang et al. |
| D704,406 | S | 5/2014 | Kern |

(56) References Cited

U.S. PATENT DOCUMENTS 8,716,969 B2 5/2014 Yang et al.
8,720,728 B2 5/2014 Yang et al.
D709,172 S 7/2014 Brandenburg et al.
D709,662 S 7/2014 Yang et al.
8,766,582 B2 7/2014 Yang et al.
8,807,378 B2 8/2014 Kaberna
8,807,379 B1 8/2014 Hammond
D714,510 S 9/2014 Yang et al.
D715,575 S 10/2014 Williams et al.
D716,015 S 10/2014 Van De Leest
8,851,316 B2 10/2014 Barrett et al.
8,872,459 B2 10/2014 Yang et al.
D717,012 S 11/2014 Han
D717,013 S 11/2014 Han
D717,014 S 11/2014 Han
D717,015 S 11/2014 Han
D719,313 S 12/2014 Kao
8,910,821 B1 12/2014 Stravitz
D725,860 S 3/2015 Spivey et al.
D725,861 S 3/2015 Yang et al.
D729,367 S 5/2015 Markwick et al.
D729,368 S 5/2015 Markwick et al.
D729,485 S 5/2015 Yang et al.
D730,008 S 5/2015 Yang et al.
9,051,093 B2 6/2015 Yang et al.
9,284,766 B2 3/2016 Wenzel
D755,461 S 5/2016 Wall
D758,686 S 6/2016 Beumer
D759,934 S 6/2016 Yang et al.
D762,037 S 7/2016 Chen
D765,937 S 9/2016 Chen
D766,998 S 9/2016 Kao et al.
9,434,538 B2 9/2016 Yang et al.
D770,121 S 10/2016 Chen
D771,344 S 11/2016 Yang et al.
D773,145 S 11/2016 Yang et al.
9,481,515 B2 11/2016 Yang et al.
D773,769 S 12/2016 Chen
9,573,759 B2 2/2017 Yang et al.
9,586,755 B1 3/2017 Yang et al.
D787,828 S 5/2017 Thoma et al.
D790,145 S 6/2017 Chen
D792,673 S 7/2017 Lloyd et al.
D793,642 S 8/2017 Yang et al.
D794,765 S 8/2017 Brandenburg et al.
D798,016 S 9/2017 Yang et al.
9,751,692 B2 9/2017 Yang et al.
9,790,025 B2 10/2017 Yang et al.
D804,133 S 11/2017 Yang et al.
9,850,064 B2 12/2017 Egan et al.
9,856,080 B2 1/2018 Yang et al.
D809,729 S 2/2018 Chen
D820,544 S 6/2018 Joseph
D825,876 S 8/2018 Chen
D827,968 S 9/2018 Chen
D829,400 S 9/2018 Yang et al.
D830,029 S 10/2018 Greenspoon et al.
D835,374 S 12/2018 Yang et al.
D835,376 S 12/2018 Yang et al.
D836,278 S 12/2018 Berberet et al.
D840,628 S 2/2019 Chang
D841,275 S 2/2019 Chen
D842,573 S 3/2019 Smeets
D845,576 S 4/2019 Lu
10,279,996 B2 5/2019 Yang et al.
10,279,997 B2 5/2019 Yang et al.
D851,350 S 6/2019 Lu
D853,065 S 7/2019 Liao
D853,067 S 7/2019 Chen
D853,068 S 7/2019 Chen
D855,919 S 8/2019 Yang et al.
D858,023 S 8/2019 Beumer et al.
D858,024 S 8/2019 Yang et al.
D858,923 S 9/2019 Yang et al.
D861,076 S 9/2019 Chen
10,413,064 B1 9/2019 Lu
10,472,170 B2 11/2019 Yang et al.
D871,564 S 12/2019 Brandenburg et al.
10,494,175 B2 12/2019 Yang et al.
D874,776 S 2/2020 Spadotto
D876,040 S 2/2020 Chen
10,654,648 B1 5/2020 Rodriguez
10,683,165 B2 6/2020 Yang et al.
10,723,549 B2 7/2020 Yang et al.
D901,815 S 11/2020 Yang et al.
D903,217 S 11/2020 Smeets
D905,367 S 12/2020 Smeets
D907,320 S 1/2021 Moreno
D911,650 S 2/2021 Liao
D911,651 S 2/2021 Liao
10,906,738 B2 2/2021 Barry
D915,712 S 4/2021 Liu
11,008,163 B2 5/2021 Wang et al.
11,027,916 B2 6/2021 Yang et al.
D925,153 S 7/2021 Busch
D929,062 S 8/2021 Chen
D930,933 S 9/2021 Yang et al.
11,136,186 B2 10/2021 Yang et al.
D936,927 S 11/2021 Zeng
D938,125 S 12/2021 Zhang
D939,174 S 12/2021 Zeng
11,279,555 B2 3/2022 Yang et al.
D951,578 S 5/2022 Lu
D963,277 S 9/2022 Yang et al.
D969,291 S 11/2022 Yang et al.
11,535,449 B2 12/2022 Yang et al.
D979,167 S 2/2023 Liao et al.
D982,273 S 3/2023 Chen
11,603,263 B2 3/2023 Yang et al.
D992,231 S 7/2023 Wang et al.
11,801,996 B2 10/2023 Yang et al.
D1,004,069 S 11/2023 Yang et al.
D1,006,373 S 11/2023 Bianchi
D1,009,652 S 1/2024 Chen
D1,013,997 S 2/2024 Wang et al.
12,043,480 B1 7/2024 Yang et al.
12,139,328 B2 11/2024 Yang et al.
D1,071,472 S 4/2025 Zhuo
D1,072,411 S 4/2025 Yang et al.
D1,072,412 S 4/2025 Yang et al.
12,351,390 B2 7/2025 Yang et al.
D1,094,941 S 9/2025 Yang et al.
12,522,432 B2 1/2026 Yang et al.
2001/0002690 A1 6/2001 Rosky
2001/0013745 A1 8/2001 Fulterer et al.
2001/0020619 A1 9/2001 Pfeifer et al.
2001/0045512 A1 11/2001 Brent
2002/0009567 A1 1/2002 Brand
2002/0066736 A1 6/2002 Pyles
2002/0092853 A1 7/2002 Wang
2002/0096523 A1 7/2002 Pyles
2002/0096524 A1 7/2002 Hardesty
2002/0100758 A1 8/2002 Pyles
2002/0104266 A1 8/2002 Ranaudo
2002/0116924 A1 8/2002 Winkelmann et al.
2003/0089719 A1 5/2003 Berger
2003/0102316 A1 6/2003 Forest
2003/0201265 A1 10/2003 Lin
2003/0205979 A1 11/2003 Papari et al.
2003/0230576 A1 12/2003 Lin
2004/0016756 A1 1/2004 Lin
2004/0028572 A1 2/2004 Sham et al.
2004/0134924 A1 7/2004 Hansen et al.
2004/0140782 A1 7/2004 Okabe et al.
2004/0164077 A1 8/2004 Kuo
2004/0174268 A1 9/2004 Scott et al.
2004/0175303 A1 9/2004 Lin
2004/0199401 A1 10/2004 Wagner
2004/0200938 A1 10/2004 Forlivio
2004/0206758 A1 10/2004 Lin
2004/0206760 A1 10/2004 Gagnebin
2004/0250711 A1 12/2004 Ernst
2004/0251746 A1 12/2004 Ichimaru et al.
2005/0017006 A1 1/2005 Kuo

(56) References Cited

U.S. PATENT DOCUMENTS

2005/0017010 A1 1/2005 Siegel et al.
2005/0029281 A1 2/2005 Westermann et al.
2005/0129803 A1 6/2005 Umeda et al.
2005/0253004 A1* 11/2005 Hsieh .................... B65F 1/1607 241/100
2005/0258177 A1 11/2005 Woodson
2005/0258794 A1 11/2005 Fukuizumi
2006/0027579 A1 2/2006 Yang et al.
2006/0091247 A1 5/2006 Matlin
2006/0103086 A1 5/2006 Niemeyer et al.
2006/0138149 A1 6/2006 Tracy
2006/0163257 A1 7/2006 Golbert
2006/0169697 A1 8/2006 Koch
2006/0175336 A1 8/2006 Wang
2006/0186121 A1 8/2006 Yang et al.
2006/0196874 A1 9/2006 Yang
2006/0237641 A1 10/2006 Moeller et al.
2006/0249510 A1 11/2006 Lin
2006/0278643 A1 12/2006 Chiou
2006/0283863 A1 12/2006 Coles
2007/0012699 A1 1/2007 Yang et al.
2007/0034334 A1 2/2007 Ramsey et al.
2007/0034723 A1 2/2007 Joachim et al.
2007/0045326 A1 3/2007 Tramontina et al.
2007/0090112 A1 4/2007 Kalman et al.
2007/0114847 A1 5/2007 Ichimaru et al.
2007/0181579 A1 8/2007 Kuo et al.
2007/0209846 A1 9/2007 Wilson
2007/0215622 A1 9/2007 Perez
2007/0241109 A1 10/2007 Lin
2007/0266637 A1 11/2007 McGowan
2007/0272691 A1 11/2007 Wang et al.
2007/0289972 A1 12/2007 Wynn et al.
2008/0011754 A1 1/2008 Ramsey
2008/0011910 A1 1/2008 Ramsey
2008/0041863 A1 2/2008 Forest
2008/0083627 A1 4/2008 Hamm
2008/0083756 A1 4/2008 Daniels
2008/0083757 A1 4/2008 Parker et al.
2008/0099274 A1 5/2008 Seel
2008/0128428 A1 6/2008 Beckerman
2008/0164257 A1 7/2008 Boll et al.
2008/0173648 A1 7/2008 Escobar et al.
2008/0236275 A1 10/2008 Breed et al.
2008/0237249 A1 10/2008 McGee
2008/0245794 A1 10/2008 Escobar et al.
2008/0257889 A1 10/2008 Kovacevich et al.
2008/0257890 A1 10/2008 Kovacevich et al.
2008/0257891 A1 10/2008 Kovacevich et al.
2008/0264948 A1 10/2008 Kovacevich et al.
2008/0264950 A1 10/2008 Kovacevich et al.
2008/0272119 A1 11/2008 Efstathiou
2008/0272127 A1 11/2008 Kovacevich et al.
2009/0008888 A1 1/2009 Boulden
2009/0071959 A1 3/2009 Cheung
2009/0084788 A1 4/2009 Yang et al.
2009/0136341 A1 5/2009 Kenyon
2009/0214606 A1 8/2009 Bujard et al.
2009/0218352 A1* 9/2009 Sued ................... B02C 18/0007 206/576
2009/0230131 A1 9/2009 McDuffie et al.
2009/0261105 A1 10/2009 Cunningham et al.
2009/0266836 A1 10/2009 Mobley
2010/0006572 A1 1/2010 Chiou
2010/0084235 A1 4/2010 Lu
2010/0096894 A1 4/2010 Fukai
2010/0122985 A1 5/2010 Peters et al.
2010/0147865 A1 6/2010 Yang et al.
2010/0170904 A1 7/2010 Kalman et al.
2010/0176126 A1 7/2010 Shikano
2010/0178105 A1 7/2010 Monneret
2010/0193518 A1 8/2010 Tontarelli
2010/0219191 A1 9/2010 Prosa
2010/0237074 A1 9/2010 Yang et al.
2010/0252557 A1 10/2010 Clements
2010/0294766 A1 11/2010 Wang et al.
2010/0294769 A1 11/2010 Lee et al.
2011/0017735 A1 1/2011 Wang et al.
2011/0049149 A1 3/2011 Shih
2011/0056952 A1 3/2011 Borowski et al.
2011/0139781 A1 6/2011 Jin et al.
2011/0156560 A1 6/2011 Michael
2011/0272409 A1 11/2011 Kasbohm
2012/0000911 A1 1/2012 Wang
2012/0111895 A1 5/2012 Fitzpatrick et al.
2012/0145932 A1 6/2012 Yao et al.
2012/0234836 A1 9/2012 Barrett et al.
2012/0234849 A1 9/2012 Hughes et al.
2012/0248149 A1 10/2012 Pelfrey
2012/0261423 A1 10/2012 Zawrotny et al.
2012/0267375 A1 10/2012 Egan et al.
2013/0001342 A1* 1/2013 Romanovich ........... B02C 23/18 241/38
2013/0002100 A1 1/2013 Badri et al.
2013/0036924 A1 2/2013 Ko
2013/0048641 A1 2/2013 Romano
2013/0097809 A1 4/2013 Weber et al.
2013/0105487 A1 5/2013 Baik
2013/0105488 A1 5/2013 Quan
2013/0240592 A1 9/2013 Woodruff
2013/0248535 A1 9/2013 Wolfe et al.
2013/0300119 A1 11/2013 Anzalon et al.
2014/0183193 A1 7/2014 Hammond et al.
2014/0238989 A1 8/2014 Wang et al.
2014/0240964 A1 8/2014 Adachi et al.
2014/0305946 A1 10/2014 Han
2014/0345453 A1 11/2014 Oh et al.
2015/0028751 A1 1/2015 Dobbins
2015/0213705 A1 7/2015 Ehrman et al.
2015/0251849 A1 9/2015 Yang et al.
2015/0321841 A1 11/2015 Salas et al.
2016/0035209 A1 2/2016 Martin et al.
2016/0137411 A1 5/2016 Rogers
2016/0162832 A1 6/2016 Thompson et al.
2016/0200508 A1 7/2016 Thoma et al.
2016/0239795 A1 8/2016 Burch, V et al.
2017/0050404 A1 2/2017 Henken et al.
2017/0052613 A1 2/2017 Alameh et al.
2017/0166167 A1 6/2017 Heller et al.
2017/0176986 A1 6/2017 High et al.
2018/0044108 A1 2/2018 Ackerman
2019/0077595 A1 3/2019 Wang et al.
2019/0169930 A1 6/2019 Niemiec
2019/0185263 A1 6/2019 Yang et al.
2020/0148467 A1 5/2020 Yang et al.
2021/0269238 A1 9/2021 Shek
2022/0097960 A1 3/2022 Yang et al.
2022/0135318 A1 5/2022 Bing et al.
2022/0135321 A1 5/2022 Yang et al.
2022/0153517 A1 5/2022 Wilhelmsen et al.
2022/0160126 A1 5/2022 Yang et al.
2022/0375320 A1 11/2022 Thompson et al.
2023/0115198 A1 4/2023 Yang et al.
2023/0286740 A1 9/2023 Yang et al.
2024/0270487 A1 8/2024 Yang et al.
2025/0136366 A1 5/2025 Yang et al.
2025/0171225 A1 5/2025 Yang et al.
2025/0242999 A1 7/2025 Yang et al.
2025/0289652 A1 9/2025 Yang et al.

FOREIGN PATENT DOCUMENTS

CA 2078813 A1 9/1992
CA 2182840 9/1997
CA 2519295 3/2007
CA 132181 6/2010
CA 2695086 9/2010
CA 136938 5/2011
CA 141819 4/2012
CA 2778535 A1 8/2013
CN 2075182 U 4/1991
CN 2378327 Y 5/2000
CN 2467467 Y 12/2001
CN 2707695 Y 7/2005

(56) References Cited

FOREIGN PATENT DOCUMENTS

| | | | |
|---|---|---|---|
| CN | 200964993 | Y | 10/2007 |
| CN | 101177946 | A | 5/2008 |
| CN | 201105898 | Y | 8/2008 |
| CN | 201330049 | Y | 10/2009 |
| CN | 201367221 | Y | 12/2009 |
| CN | 201372076 | Y | 12/2009 |
| CN | 201447201 | U | 5/2010 |
| CN | 201512253 | U | 6/2010 |
| CN | 201597962 | U | 10/2010 |
| CN | 201625566 | | 11/2010 |
| CN | 201907743 | U | 7/2011 |
| CN | 202213911 | U | 5/2012 |
| CN | 301947175 | S | 6/2012 |
| CN | 203006242 | U | 6/2013 |
| CN | 103207416 | A | 7/2013 |
| CN | 103300590 | A | 9/2013 |
| CN | 103303618 | A | 9/2013 |
| CN | 204587817 | U | 8/2015 |
| CN | 205169479 | U | 4/2016 |
| CN | 106690938 | A | 5/2017 |
| CN | 107032015 | A | 8/2017 |
| CN | 107495686 | A | 12/2017 |
| CN | 109775193 | A | 5/2019 |
| CN | 305634902 | | 3/2020 |
| CN | 112407663 | A | 2/2021 |
| CN | 307220540 | | 4/2022 |
| CN | 307232793 | | 4/2022 |
| CN | 307264711 | | 4/2022 |
| CN | 309146470 | | 3/2025 |
| DE | 1610087 | | 7/1950 |
| DE | 822376 | | 11/1951 |
| DE | 1283741 | | 7/1966 |
| DE | 7503716 | U | 8/1975 |
| DE | 8436939 | | 3/1985 |
| DE | 9108341 | | 10/1991 |
| DE | 4225936 | | 2/1994 |
| DE | 19525885 | | 3/1997 |
| DE | 19617823 | | 11/1997 |
| DE | 19809331 | | 5/1999 |
| DE | 19811991 | A1 | 9/1999 |
| DE | 19824941 | A1 | 12/1999 |
| DE | 29918687 | | 3/2000 |
| DE | 19933180 | | 1/2001 |
| DE | 19937170 | A1 | 2/2001 |
| DE | 10036259 | A1 | 11/2001 |
| DE | 10148997 | | 4/2003 |
| DE | 10155943 | A1 | 5/2003 |
| DE | 20305521 | U1 | 6/2003 |
| DE | 20217561 | | 3/2004 |
| DE | 10305311 | A1 | 8/2004 |
| DE | 10337806 | A1 | 3/2005 |
| DE | 202006016420 | U1 | 2/2007 |
| DE | 202004021206 | U1 | 4/2007 |
| DE | 202009016101 | U1 | 4/2011 |
| DE | 102017114984 | A1 | 1/2018 |
| EP | 0582240 | | 7/1993 |
| EP | 0903305 | A1 | 3/1999 |
| EP | 0906876 | A2 | 4/1999 |
| EP | 1094017 | A1 | 4/2001 |
| EP | 1162161 | | 12/2001 |
| EP | 1172307 | A1 | 1/2002 |
| EP | 1193690 | A1 | 4/2002 |
| EP | 0957046 | B1 | 8/2003 |
| EP | 1361176 | A1 | 11/2003 |
| EP | 1136393 | B1 | 4/2004 |
| EP | 1447342 | A2 | 8/2004 |
| EP | 1457438 | A1 | 9/2004 |
| EP | 1481924 | A1 | 12/2004 |
| EP | 1508537 | A1 | 2/2005 |
| EP | 1600373 | A2 | 11/2005 |
| EP | 1602599 | A2 | 12/2005 |
| EP | 1623937 | A1 | 2/2006 |
| EP | 1647503 | A1 | 4/2006 |
| EP | 1686073 | A1 | 8/2006 |
| EP | 1816090 | A1 | 8/2007 |
| EP | 1918223 | A1 | 5/2008 |
| EP | 1700799 | B1 | 8/2009 |
| EP | 001164826-0001 | | 9/2009 |
| EP | 001232904-0001 | | 10/2010 |
| EP | 2343250 | A1 | 7/2011 |
| EP | 2387911 | A1 | 11/2011 |
| EP | 2636613 | B1 | 3/2015 |
| EP | 3042864 | A1 | 7/2016 |
| EP | 3167789 | A1 | 5/2017 |
| EP | 4292955 | A2 | 12/2023 |
| ES | 1022452 | U | 4/1993 |
| ES | 2253079 | B1 | 6/2004 |
| FR | 2887152 | | 12/2006 |
| GB | 191004921 | | 6/1910 |
| GB | 968738 | A | 9/1964 |
| GB | 1555543 | A | 11/1979 |
| GB | 2046694 | A | 11/1980 |
| GB | 2096919 | B | 10/1982 |
| GB | 2384418 | | 7/2003 |
| GB | 2559346 | A | 8/2018 |
| JP | 02-152670 | | 6/1990 |
| JP | H06-56011 | | 8/1994 |
| JP | 06-272888 | | 9/1994 |
| JP | 2004-106713 | | 4/2004 |
| JP | 2004-231237 | | 8/2004 |
| JP | D1300450 | | 5/2007 |
| JP | D1300451 | | 5/2007 |
| JP | 2007-154831 | A | 6/2007 |
| JP | D1322056 | | 2/2008 |
| JP | D1398668 | | 10/2010 |
| JP | 2013-231413 | A | 11/2013 |
| JP | 2014-523329 | A | 9/2014 |
| JP | 2020-143829 | A | 9/2020 |
| KR | 20040087306 | A | 10/2004 |
| KR | 3003841370000 | | 6/2005 |
| KR | 3004095430000 | | 3/2006 |
| KR | 3004095430001 | | 7/2006 |
| NL | 6908550 | | 12/1970 |
| NL | 1005057 | C2 | 7/1998 |
| TW | 183920 | | 5/1992 |
| TW | 230977 | | 9/1994 |
| TW | 395392 | | 6/2000 |
| TW | D112733 | | 9/2006 |
| TW | D129485 | | 7/2009 |
| TW | D133382 | | 2/2010 |
| TW | D133678 | | 3/2010 |
| TW | 145989 | | 3/2012 |
| TW | D162495 | | 8/2014 |
| TW | 201720729 | | 6/2017 |
| WO | WO 92/02430 | A1 | 2/1992 |
| WO | WO 96/33671 | | 10/1996 |
| WO | WO 2005/080232 | A1 | 9/2005 |
| WO | WO-2005097329 | A1 * | 10/2005 ................ B65F 1/08 |
| WO | WO 2006/079263 | A1 | 8/2006 |
| WO | WO 2007/139570 | | 12/2007 |
| WO | WO 2009/114495 | A1 | 9/2009 |
| WO | WO 2012/088718 | A1 | 7/2012 |
| WO | WO 2015/134902 | A1 | 9/2015 |
| WO | WO 2015/138625 | A1 | 9/2015 |
| WO | WO 2016/054109 | A1 | 4/2016 |
| WO | WO 2016/133407 | A1 | 8/2016 |
| WO | WO 2021/180516 | A1 | 9/2021 |
| WO | WO 2023/064221 | A1 | 4/2023 |
| WO | WO 2023/215375 | | 11/2023 |

OTHER PUBLICATIONS

U.S. Appl. No. 15/476,285, filed Mar. 31, 2017, Yang et al.

U.S. Appl. No. 29/747,968, filed Aug. 26, 2020, Yang et al.

Trento Corner 23 Trash Can, Hailo product webpage, May 2008, http://www.hailo.de/html/default.asp?site=12_71_107&lang=en.

Alzashop.com, Simplehuman 45L Pedal Rectangular White Plastic Stainless Steel Trash Can, https://www.alzashop.com/simplehuman-45l-pedal-rectangular-white-plastic-stainless-steel-d5841987.htm, site visited Jul. 20, 2021, in 3 pages.

Simplehuman Liner Rim Dual Bucket Rectangular Recycler with Liner Pocket, Stainless Steel, 58 Liter / 15 Gallon, Item No. CW2025, www.Amazon.com, site visited Dec. 29, 2015.

(56) References Cited

OTHER PUBLICATIONS

Web page showing picture of Hero Bullet trash can, archived Nov. 17, 2004, downloaded from http://web.archive.org/web/20041117003115/http://www.simplehuman.com/images/hero_bullet.jpg.
YouTube.com, "Automatic trash can pull out cabinet with Arduino (DIY)", dated Oct. 9, 2019, https://www.youtube.com/watch?v=mmcgTaE45_Y, entire video, including screenshot in 1 page.
YouTube.com, "trash pullout with servo drive installed", dated Jun. 17, 2011, https://www.youtube.com/watch?v=tO1SbtllEh8, entire video, including screenshots in 3 pages.
Brabantia 121623 Bo Pedal Bin, available online Apr. 12, 2018, site visited Dec. 6, 2024, https://www.amazon.com/ae/dp/B0791 5MP85/, in 6 pages.
iTouchless Semi-Round SoftStep 13.2 Gallon Step Trash Can, date first available May 17, 2021, www.amazon.com/iTouchless-Fingerprint-Space-Saving-Stainless-Steel-Semi-Round/dp/B09553H6QH?source=ps-sl-shoppingads-Ipcontext&ref, 8 pages.
KOHLER 6-Liter step trash can, Amazon.com Listing and Kohler.com Listing, including Customer Review dated Feb. 17, 2021, in 15 pages.
Simplehuman Stainless Steel Semi Round Trash Bin, date first available Aug. 6, 2012, www.amazon.ae/Simplehuman-Stainless-Steel-Silver-Liters-CW1833/dp/B001BO76WY/, 6 pages.
Brightroom, 10L Stainless Slim Step Trash Can, available online 2021, site visited Apr. 27, 2025, https://www.target.com/p/10l-stainless-slim-step-trash-can-brightroom-8482/-/A-83279889, in 9 pages.
Home Depot, 2.6 Gallons Stainless Slim Step-On Trash Can, available online Apr. 2020, site visited Apr. 27, 2025, https://www.homedepot.com/p/StyleWell-2-6-Gal-Stainless-Steel-Slim-Step-On-Trash-Can_STY-SOT-10-35/316759338, in 6 pages.
Nine Stars, XZD-10-35 Step on Trash Can, available online Apr. 2022, site visited Apr. 27, 2025, https://www.amazon.com/NINESTARS-XZD-10-35-Trash-Small-Silver/dp/B09RTPJFMG, in 8 pages.

* cited by examiner

PAPER SHREDDING TRASHCAN

REFERENCE TO RELATED APPLICATIONS

This applications claims the benefit of U.S. Provisional Application No. 63/364,316, filed May 6, 2022, and U.S. Provisional Application No. 63/488,383, filed Mar. 3, 2023. This application hereby incorporates by reference the above-identified provisional applications in their entireties. Any and all applications for which a foreign or domestic priority claim is identified in the Application Data Sheet as filed with the present application are hereby incorporated by reference under 37 CFR 1.57.

BACKGROUND

Field

This disclosure relates generally to refuse disposal assemblies and particularly to paper shredder assemblies.

Description of the Related Art

Paper shredders are often used to shred a variety of items, such as documents, envelopes, credit cards, paper products, etc. In the prior art, a paper shredder is a free-standing device that fills up with shredded refuse until it needs to be emptied. A user then removes the shredded refuse from the paper shredder to throw it away.

SUMMARY

In some embodiments, a single composite device can be configured to receive both whole refuse and shredded refuse in different locations at the same time. The device can include a receptacle for receiving whole refuse and a separate but removably attachable paper shredder. The paper shredder can include a receptacle and a paper shredder with a housing. The housing can include a first portion positioned above a second portion, a removable base at least partially attached to the housing via a magnetic force, a shredder assembly disposed within the first portion of the housing, and a paper shredder receptacle disposed within the second portion of the housing. An attachment such as a hook assembly can be coupled to the first portion of the housing. The hook assembly can include a body extending along at least a portion of the rear wall of the housing and a hook coupled to a first end of the body. The hook is configured to couple the paper shredder assembly to the receptacle.

In some embodiment, a paper shredder assembly can include a shredder, a first receptacle positioned below the shredder, a housing comprising a front wall, a rear wall, lateral side walls connecting the front wall and the rear wall, and a base. The housing can be configured to enclose the receptacle. A magnet can be positioned in the base of the housing. A hook assembly can be coupled to an upper portion of a rear wall of the housing. The hook assembly can include a body extending along at least a portion of the rear wall of the housing and a hook coupled to a first end of the body. The base and receptacle can be removable from the paper shredder.

In some embodiments, the base is separate from the receptacle and configured to support the receptacle. In some embodiments, the magnet couples the base of the housing to the walls of the housing. In some embodiments, the hook is coupled to a second receptacle. In some embodiments, the paper shredder assembly further includes a lid. In some embodiments, the body of the hook assembly extends below the base of the housing. In some embodiments, the paper shredder assembly further includes an adhesive positioned on a first side of the body of the hook assembly. In some embodiments, the shredder assembly is permanently coupled to the hook assembly via the housing. In some embodiments, the body of the hook assembly further comprises a groove configured to allow space for a charging cord.

In some embodiments, a paper shredding trashcan includes a receptacle and a paper shredder. The paper shredder includes a housing, a shredder assembly, a paper shredder receptacle, and a hook assembly. The housing includes a first portion positioned above a second portion and a removeable base at least partially attached to the housing via a magnetic force or any other suitable coupling. The shredder assembly is disposed within the first portion of the housing. The paper shredder receptacle is disposed within the second portion of the housing. The hook assembly is coupled to the first portion of the housing. The hook assembly includes a body extending along at least a portion of the rear wall of the housing and a hook coupled to a first end of the body. The hook is configured to couple the paper shredder assembly to the receptacle.

In some embodiments, the second portion of the housing is removeable from the first portion. In some embodiments, the body of the hook assembly extends below the second portion of the housing. In some embodiments, the receptacle and paper shredder further include an adhesive positioned on a first side of the body of the hook assembly. In some embodiments, the shredder assembly is permanently coupled to the hook assembly via the first portion of the housing. In some embodiments, the body of the hook assembly further includes a groove configured to allow space for a charging cord.

In another embodiment, a method of using a paper shredder can include attaching a paper shredder assembly to a receptacle, the paper shredder assembly including a shredder positioned above a shredder receptacle. A hook assembly can be coupled to the first portion of the housing. The hook assembly can include a body extending along at least a portion of the rear wall of the housing and a hook coupled to a first end of the body configured to attach the paper shredder assembly to the receptacle. The method of using the paper shredder can include leaving the paper shredder assembly attached to the receptacle, shredding at least one item using the paper assembly, removing the shredder receptacle from the paper shredder assembly, and emptying the contents of the shredder receptacle into the receptacle.

In some embodiments, the method can include returning the shredder receptacle to the paper shredder assembly. In some embodiments, the shredder receptacle is removed by applying a downward force to a base of the paper shredder assembly. In some embodiments, the method includes opening a lid of the shredder assembly prior to shredding at least one item. In some embodiments, the shredder receptacle is removed by applying a horizontal force to a portion of the housing of the paper shredder assembly. In some embodiments, the paper shredder assembly is attached to the larger receptacle by way of a hook.

In some embodiments, a paper shredder includes a shredder, a receptacle, a housing, a coupler, and an attachment such as a hook assembly. The receptacle is positioned below the shredder. The housing includes a base. The housing is configured to enclose the shredder and the receptacle. The coupler is positioned in the base of the housing. The coupler includes a moveable portion and one or more protrusions.

The hook assembly is coupled to an upper portion of the housing. The hook assembly includes a body extending along at least a portion of the housing, the body comprising a receiving area having one or more recesses configured to receive the one or more protrusions, and a hook coupled to a first end of the body. The base and receptacle are removable from the paper shredder when the coupler is disengaged.

In some embodiments, the coupler further includes a magnet. In some embodiments, the receiving area further includes a magnet configured to attract the magnet of the coupler. In some embodiments, the paper shredder further includes a lid. In some embodiments, the body of the hook assembly extends below the base of the housing. In some embodiments, the body of the hook assembly includes a groove configured to allow space for a charging cord. In some embodiments, the paper shredder includes a grip portion configured to disengage the coupler. In some embodiments, the shredder is coupled to the housing via one or more fasteners. Each fastener is at least partially surrounded by a vibration interface.

BRIEF DESCRIPTION OF THE DRAWINGS

Some of these drawings are schematic, showing some examples of basic parts and concepts. Many different or additional structures, implementations, components, mechanisms, steps, and processes can be used. The claimed inventions should not be limited in any way to anything illustrated in the drawings.

DETAILED DESCRIPTION

Figure 1A:
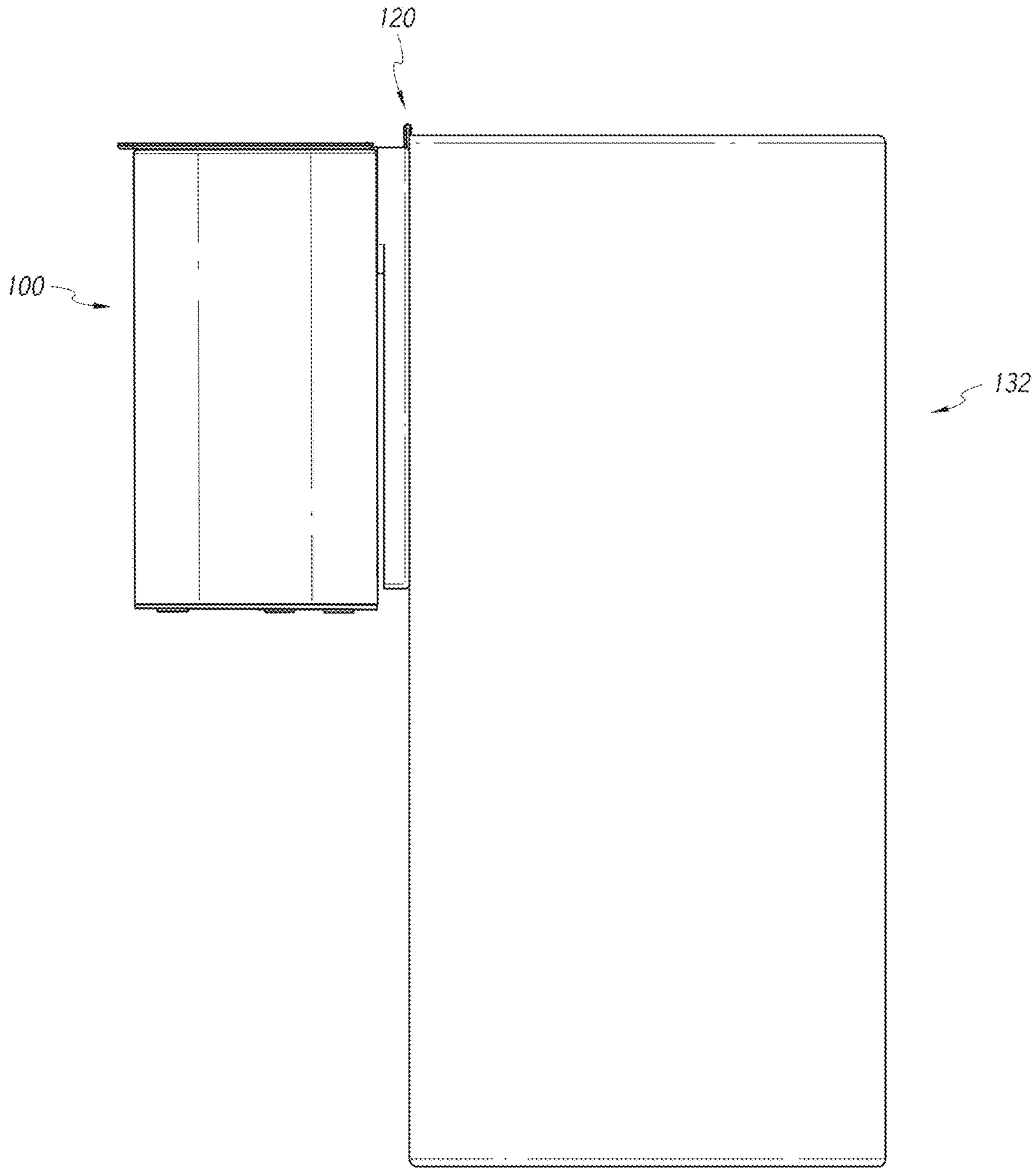
FIG. 1A illustrates an embodiment of a paper shredder assembly coupled to a receptacle.

This specification provides textual descriptions and illustrations of many devices, components, assemblies, and subassemblies. Any structure, material, function, method, or step that is described and/or illustrated in one example can be used by itself or with or instead of any structure, material, function, method, or step that is described and/or illustrated in another example or used in this field. The text and drawings merely provide examples and should not be interpreted as limiting or exclusive. No feature disclosed in this application is considered critical or indispensable. The relative sizes and proportions of the components illustrated in the drawings form part of the supporting disclosure of this specification but should not be considered to limit any claim unless recited in such claim.

FIG. 1A schematically illustrates an embodiment of a paper shredder, such as a paper shredder assembly 100 removably connected to a receptacle 132. The receptacle 132 can be a trashcan, a recycling bin, a waste container, etc. The paper shredder assembly 100 can be removably attachable to the receptacle 132 in any suitable way. In some embodiments, the removable attachment of the shredder assembly 100 to the receptacle 132 can allow the shredder assembly 100 to be securely fixed in place without moving during normal use and can allow the shredder assembly 100 to be quickly and conveniently removed by a user without the use of tools such as during emptying of the shredded contents of the shredder assembly 100. For example, in some embodiments the shredder assembly 100 can be removably attached, at least in part, by a hook assembly 120 discussed in more detail below. As illustrated, when attached during and between uses, the shredder assembly 100 can be positioned entirely outside of the receptacle 132 such that the shredder assembly 100 can be removed from the receptacle 132 without opening the lid or body of the receptacle 132.

The paper shredder assembly 100 can be smaller in size than the receptacle 132. For example, the height of the shredder assembly 100 can be substantially less than the height of the receptacle 132 to which the shredder assembly 100 is removably attached. In some embodiments, as illustrated, the height of the shredder assembly 100 can be less than or equal to about half of the height of the receptacle 132. The top of the shredder assembly 100 when attached to the receptacle 132 can be generally even with or proximate or adjacent to or in contact with the top of the receptacle 132 and/or proximate or adjacent to or in contact with a lid or trim ring positioned at or around the top of the receptacle 132, while the bottom of the shredder assembly 100 when attached to the receptacle 132 can be positioned far from the bottom of the receptacle 132. For example, when attached, the distance between the bottom of the shredder assembly 100 and the bottom of the receptacle 132 can be about at least as large as the height of the shredder assembly 100. In some embodiments, each of the shredder assembly 100 and the receptacle 132 has a width dimension and a depth dimension. As shown, the width dimension can be larger than the depth dimensions. The width dimension of the shredder assembly 100 can be about the same size as or smaller than the depth dimension of the receptacle 132 such that the shredder assembly 100 can be attached to a lateral side of the receptacle 132 without extending beyond or without extending substantially beyond the front or rear edges of the lateral side of the receptacle 132.

Attaching the paper shredder assembly 100 to a receptacle 132 can provide a number of benefits. For example, when retrieving and disposing of mail, users often will have some refuse that needs to be shredded (e.g., papers containing financial, medical, or other private information, etc.) and some refuse that does not need to be shredded (e.g., coupons, magazines, newspapers, etc.). Positioning the shredder assembly 100 near the receptacle 132 allows users to dispose of both in the same general location. Also, when emptying the paper shredder assembly 100, the larger receptacle 132 is directly next to the paper shredder assembly 100. This reduces the time and distance that would be required if the paper shredder assembly was in a different room or location. Additionally, the paper shredder assembly 100 can be stored in a location where it does not take up a large amount of space or in a location where it is easily remembered. Further, the paper shredder assembly 100 can be stored in a convenient location, such as a kitchen where a user might open mail or documents with sensitive information that they would prefer to shred rather than throw out in one piece.

Figure 1B:
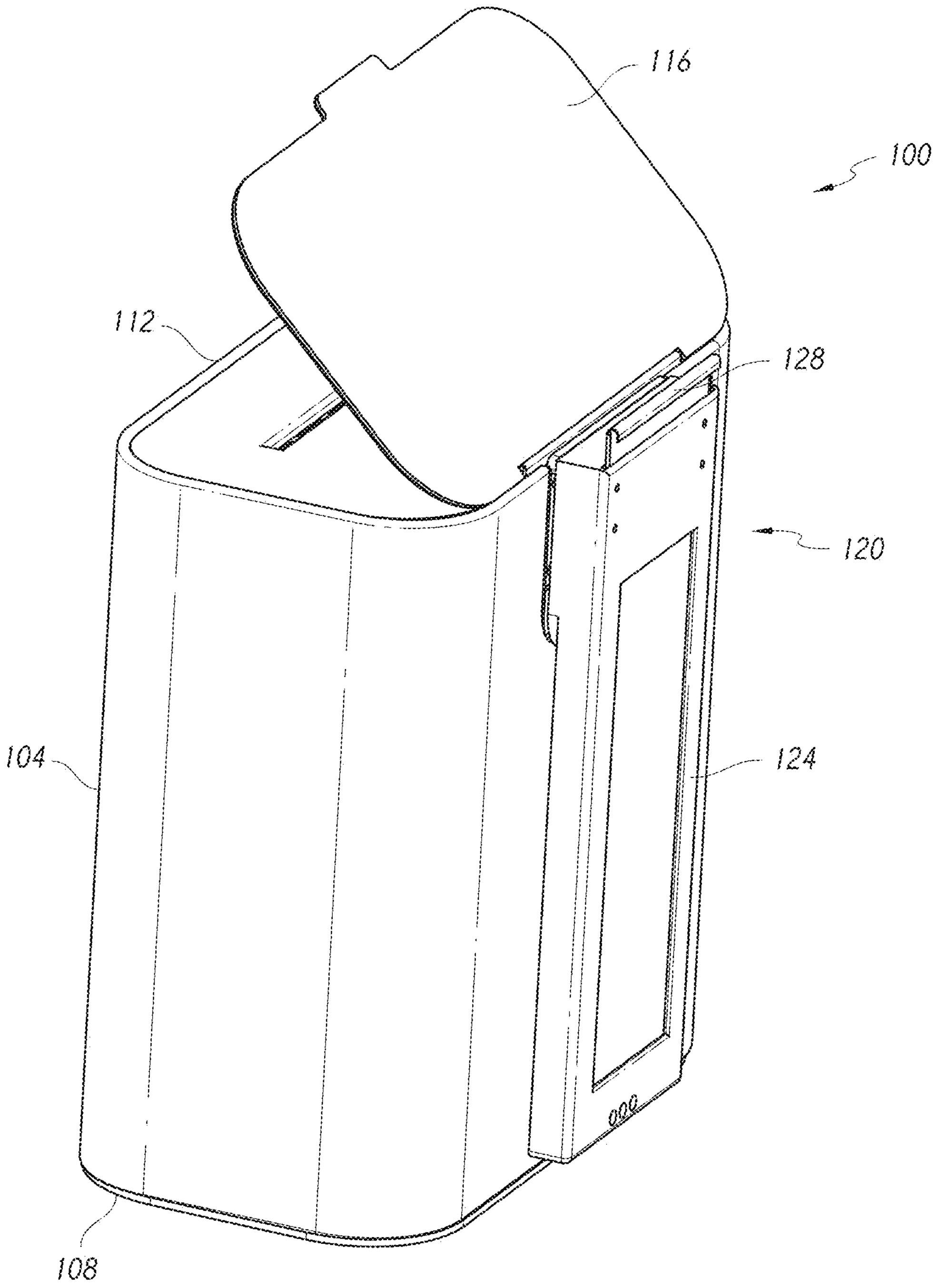
FIG. 1B illustrates a perspective view of an example embodiment of the paper shredder assembly.
Figure 1C:
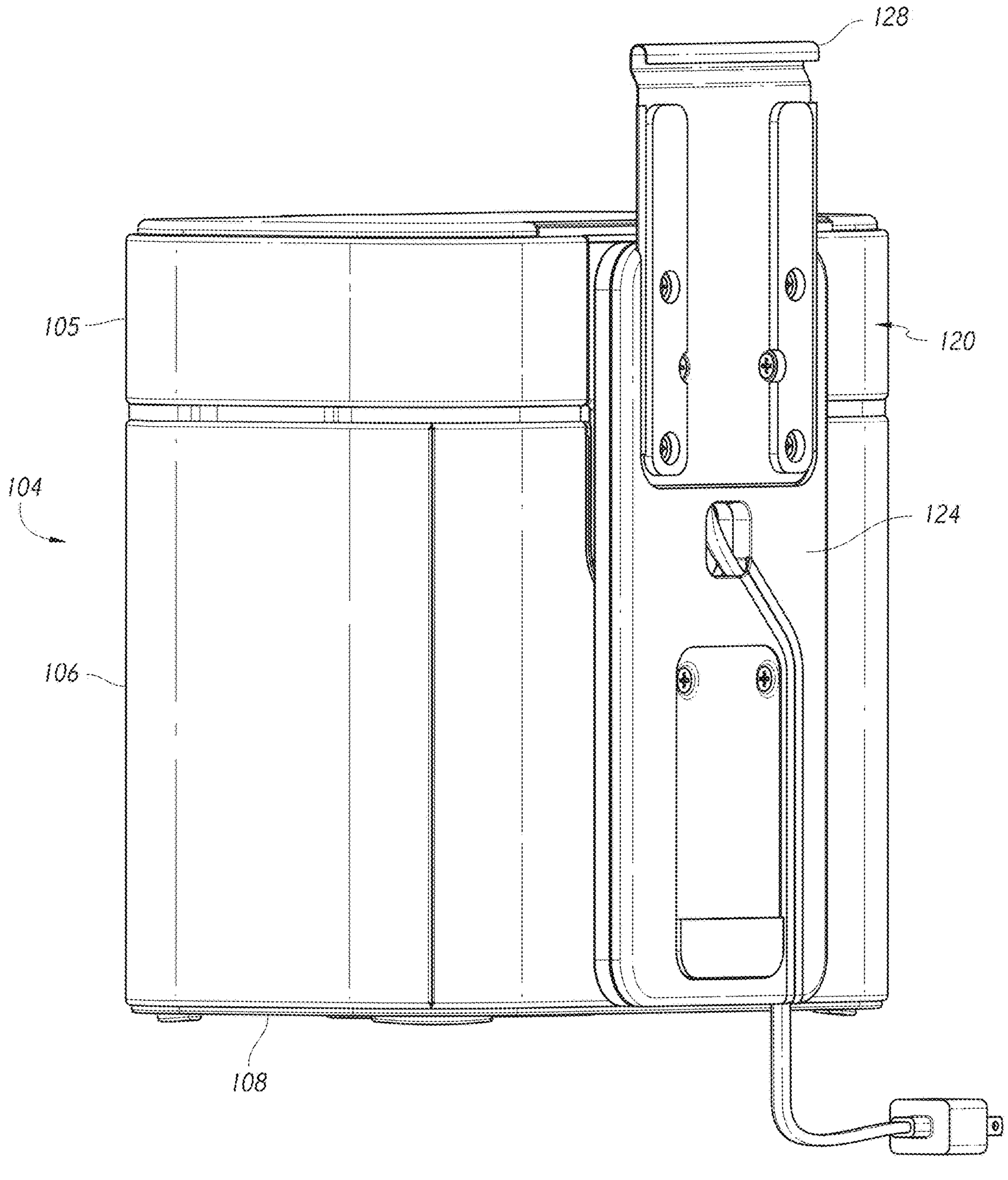
FIG. 1C illustrates a perspective view of an example embodiment of the paper shredder assembly having a top housing portion and a bottom portion.

FIG. 1B illustrates a perspective view of an example embodiment of the paper shredder assembly 100. The paper shredder assembly 100 can include a housing 104, a base portion 108 and a top portion 112. The base portion 108 can be removable from the housing 104. In some embodiments, the paper shredder assembly 100 can include a lid 116. The lid 116 can be fully removable. The lid 116 can be coupled to the paper shredder assembly 100 via a hinge. The housing 104 can extend upward from the base portion 108 to the top portion 112. The housing 104 can include a front wall, a rear wall, and lateral side walls connecting the front wall and the rear wall. In some embodiments, the housing 104 can be formed by two separate housing portions, for example a top housing portion 105 removably connected to a bottom housing portion 106, for example, as shown in FIG. 1C.

The paper shredder assembly 100 can include an attachment configured to removably attach the paper shredder assembly 100 to the receptacle 132 by a user without tools. In some embodiments, the attachment can be a hook assembly 120. The hook assembly 120 can include a body portion 124 and a hook 128. The hook assembly 120 can be coupled to the paper shredder assembly 100. The hook assembly 120 can be removably attached to the paper shredder assembly 100. The hook assembly 120 can be permanently attached to the paper shredder assembly 100. The hook assembly 120 can be attached to the paper shredder assembly 100 via a magnetic force. The hook assembly 120 can be mechanically attached to the paper shredder assembly 100. In some embodiments, the attachment can be accomplished in any other or additional way, such as by adhesion, magnet(s), hook and loop fastener(s), protrusion(s) and recess(es), tongue and groove fit, snap fit, friction fit, and/or strap(s), etc.

In some embodiments, the attachment can be solely coupled to a top portion of a wall of the housing 104. In some embodiments, the attachment can be coupled to at least a portion of a wall of the housing 104. In some embodiment, at least a portion of the body portion 124 can be coupled to the housing 104. In some embodiments, the entire length of the body portion 124 can be coupled to the housing. The body portion 124 can extend down a rear side of the housing 104 of the paper shredder assembly 100. The extension of the body portion 124 may or may not be coupled to the housing 104. The hook 128 can be coupled to a first end of the body portion 124 of the attachment. The attachment can be configured to removably attach the paper shredder assembly 100 to a receptacle 132, trash can, bin, etc., as shown in FIG. 1A.

In some embodiments, the paper shredder assembly 100 can have a height of about 7 inches to about 15 inches, for example, about 7 inches, about 10 inches, about 12 inches, about 13 inches, about 15 inches, or any value in between. In some embodiments, the paper shredder assembly 100 can have a width of about 7 inches to about 15 inches, for example, about 7 inches, about 9 inches, about 11 inches, about 13 inches, about 15 inches, or any value in between. The paper shredder assembly 100 can have a depth of about 4 inches to about 8 inches, for example, about 4 inches, about 6 inches, about 8 inches, or any value in between. The paper shredder assembly 100 can be sized such that one or more of its dimensions are generally the same as or generally correspond to one or more of the dimensions of the receptacle to which it is being attached.

Figure 2:
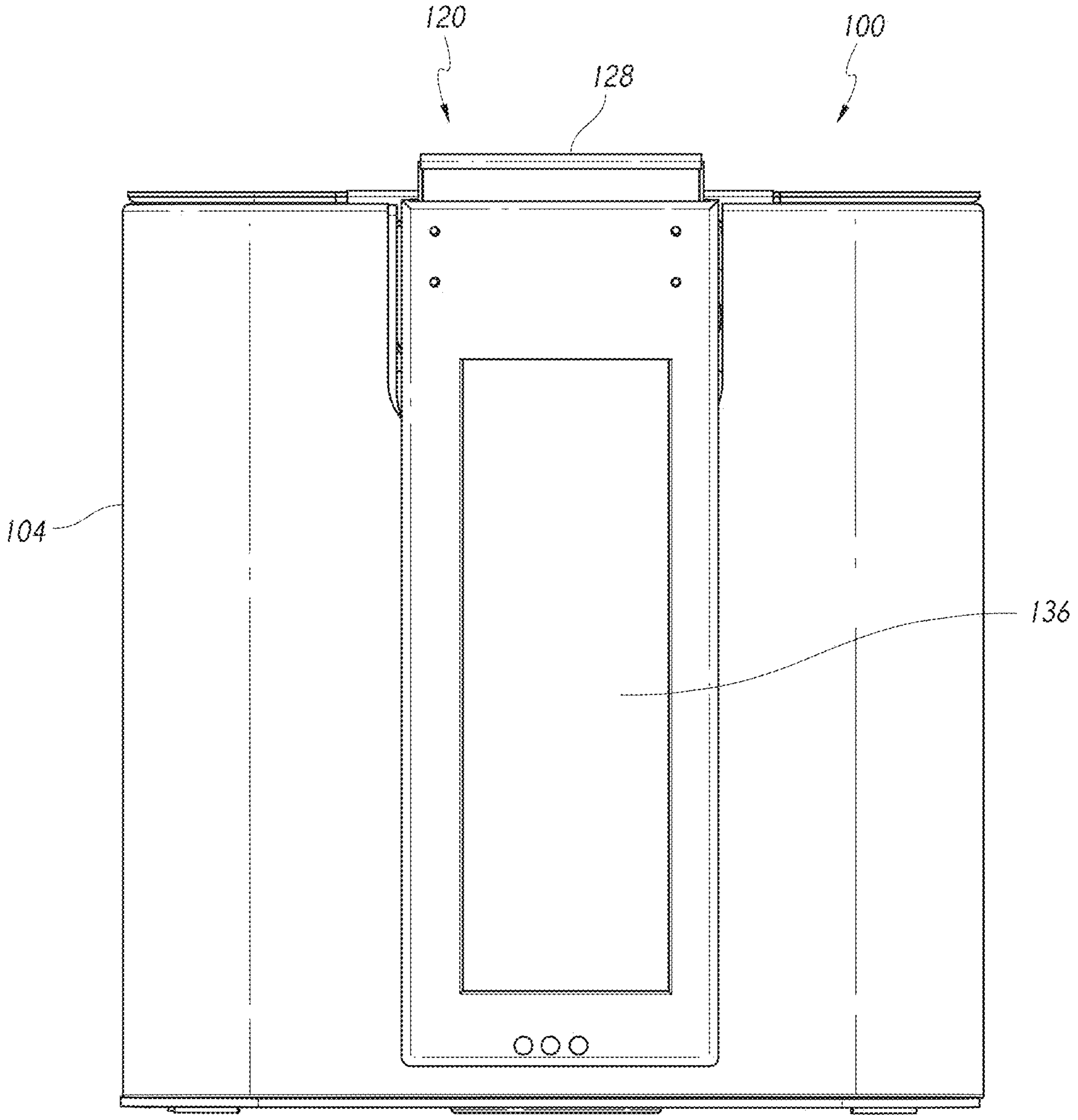
FIG. 2 illustrates a rear view of the paper shredder assembly of FIG. 1B.

FIG. 2 illustrates a rear view of the paper shredder assembly 100. In some embodiments, the hook assembly 120 can be coupled to the rear wall of the paper shredder assembly 100. The hook 128 can extend up and past the top of the paper shredder assembly 100. In some embodiments, the hook assembly 120 can include an adhesive 136. The adhesive 136 can be used to help couple the paper shredder assembly 100 to a receptacle (e.g., receptacle 132). In some embodiments, the adhesive 136 and the hook 128 can work together to better secure the paper shredder assembly 100 to the receptacle 132 by providing at least two spaced-apart points of fixation between the paper shredder assembly 100 and the receptacle 132.

Figure 3A:
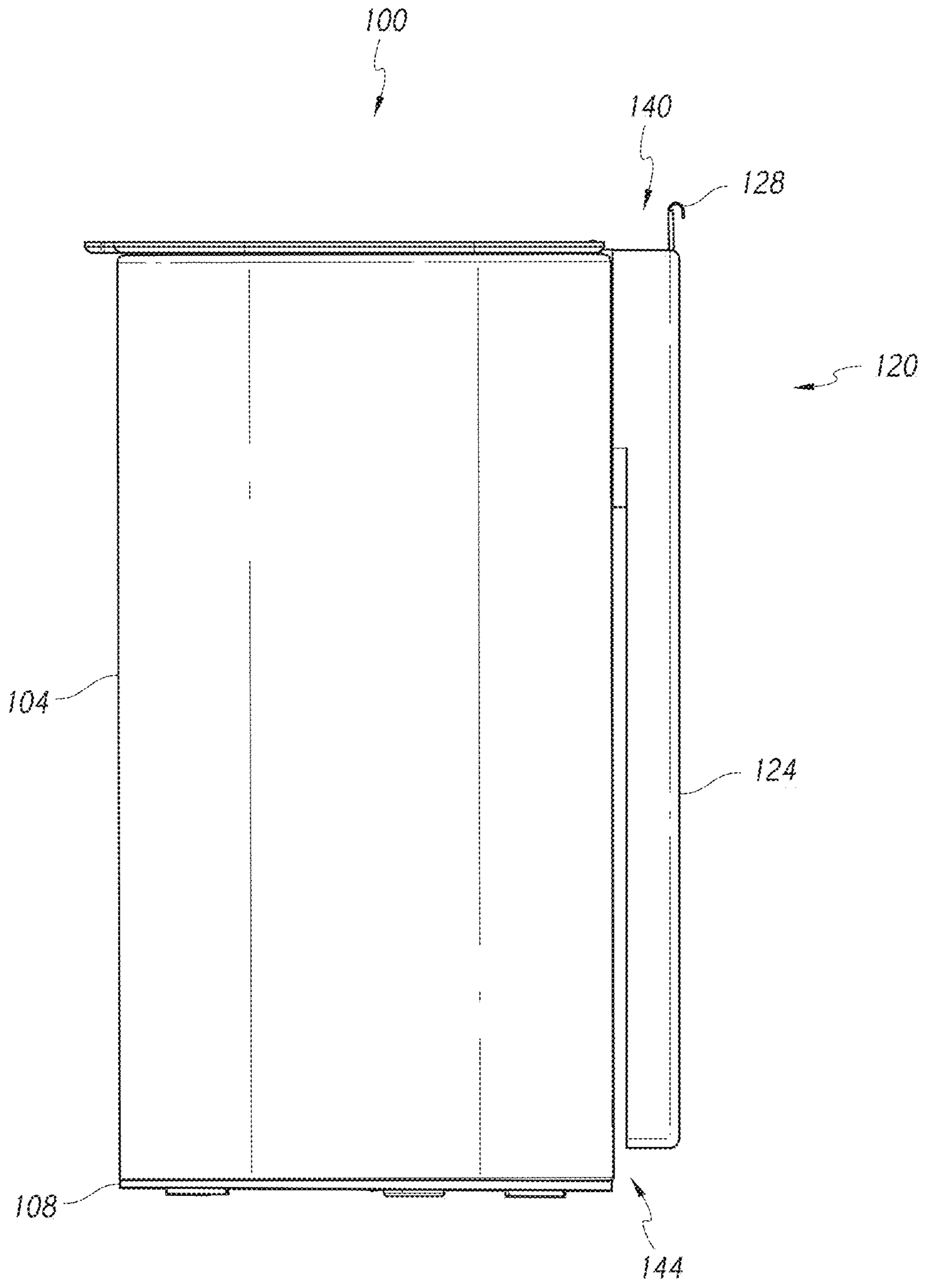
FIG. 3A illustrates a side view of the paper shredder assembly of FIG. 1B.

FIG. 3A illustrates a side view of the paper shredder assembly 100. As described herein, the hook assembly 120 can be coupled to the housing 104 of the paper shredder assembly 100. An upper portion 140 of the body portion 124 of the hook assembly 120 can be coupled to an upper portion of the rear wall of the housing 104. There can be a space 144 between at least a portion of the body portion 124 of the hook assembly 120 and the rear wall of the housing 104. This space 144 can provide access for a charging cord. In some embodiments, a channel can extend along the body portion 124 of the hook assembly 120. The channel can extend along the housing facing side of the body portion 124. The channel can provide a space for a charging cord. In some embodiments, there may not be a space between a portion of the body portion 124 of the hook assembly 120 and the rear wall of the housing 104. In some embodiments, where there is not a space, a channel providing a space for a charging cord can extend through the body portion 124 of the hook assembly 120, for example, as shown in FIG. 1C.

In some embodiments, the body portion 124 can further extend below the base portion 108 of the paper shredder assembly 100. The body portion 124 can form an L-shape. A first region of the body portion 124 can extend in a generally vertical direction and a second region of the body portion can extend in a generally horizontal direction that is generally perpendicular to the generally vertical direction. The first region can be configured to generally abut or extend along an outer wall of the receptacle 132 and the second region can be configured to generally extend away from and/or perpendicular to the outer wall of the receptacle 132. The bottom extension can provide additional support to the paper shredder assembly 100.

Figure 3B:
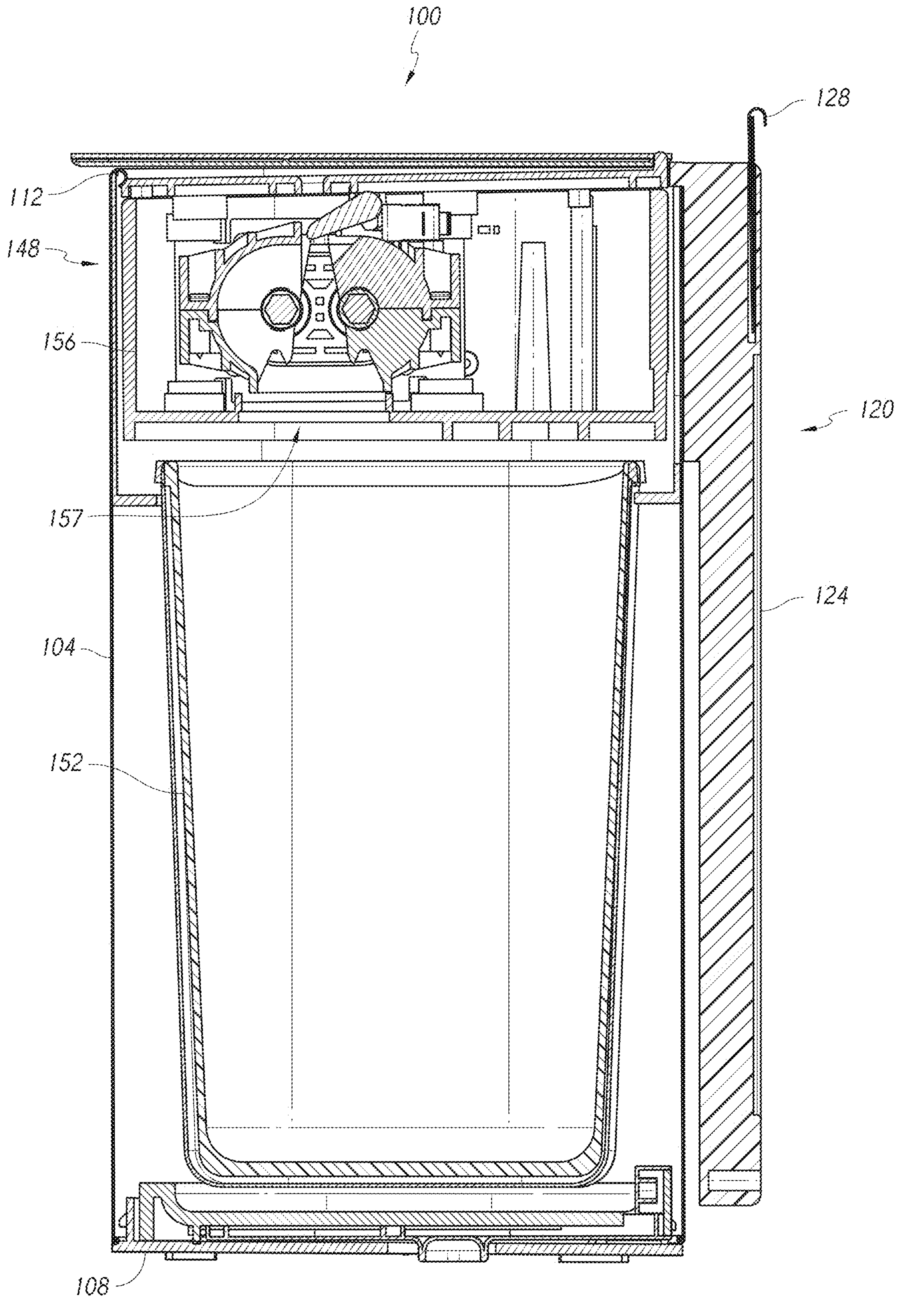
FIG. 3B illustrates a cross-section of FIG. 3A showing the interior of the paper shredder assembly.

FIG. 3B illustrates a cross-sectional view of the paper shredder assembly 100. The paper shredder assembly 100 can include a receptacle 152 and a shredder assembly 148. The shredder assembly 148 can be positioned above the receptacle 152. The shredder assembly 148 can include one or more components configured to supply electrical power (e.g., a rechargeable battery, a transformer, and/or a power cord), an electric motor, one or more driving components (e.g., one or more gears, sprockets, chains, belts), one or more shredding components (e.g., one or more shredding rotors, blades, fingers, teeth, etc.), a display (e.g., one or more screens, lights, and/or speakers), and/or a processor configured to control the electric motor. In some embodiments, as shown, some or all components of the shredder assembly 148 can be positioned entirely outside of the receptacle 152 such that the shredder assembly 148 can be removed without opening the lid or housing of the receptacle 152. The shredder assembly 148 can be configured to shred items that are generally thin, flat, and wide, including but not limited to paper, recyclables, mail, credit cards, letters, etc. The base 108 can be configured to support the receptacle 152.

Figure 3C:
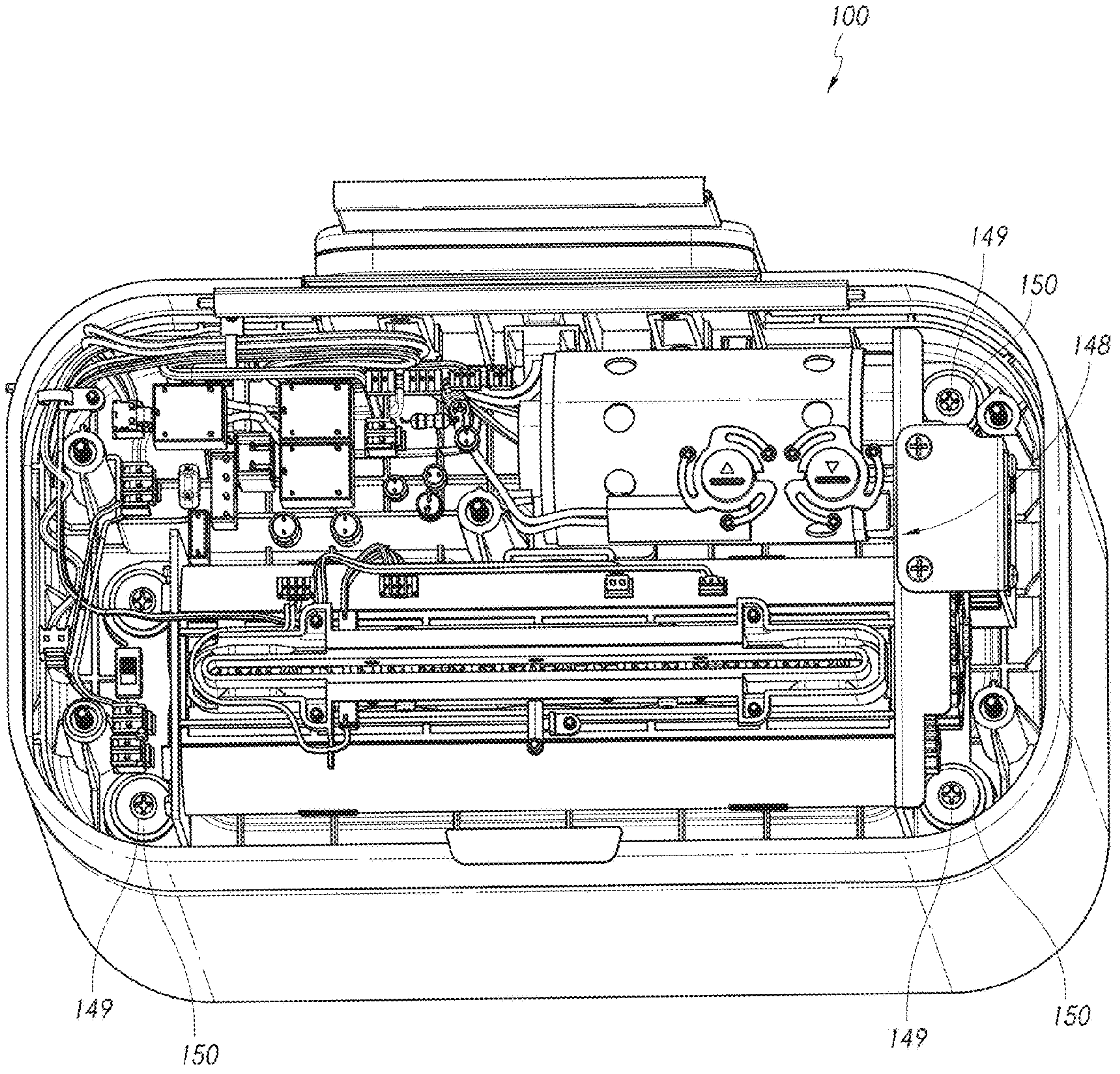
FIG. 3C illustrates a top view of the shredder components of the paper shredder assembly of FIG. 1B including vibration interfaces.

In some embodiments, the shredder assembly 148 can be enclosed by a shredder housing 156. The shredder housing 156 can be coupled to the housing 104. In some embodiments, the shredder housing 156 can be the top housing portion 105 shown in FIG. 1C. In some embodiments, the shredder assembly 148 can be coupled to the shredder housing 156 by one or more fasteners 149, for example, screws as shown in FIG. 3C. In some embodiments, a vibration interface 150 may be positioned at least partially around a corresponding fastener 149. The vibration interface 150 may be positioned along the length of the fastener 149 between the head of the fastener 149 and a surface of the shredder housing 156. The vibration interface 150 can mitigate or reduce any vibration or noise that is produced by the shredder assembly 148, when the shredder assembly 148 is shredding an item. In some embodiments, the vibration interface 150 can comprise an elastic, flexible, compressible, or resilient material. In some embodiments, the vibration interface 150 can be a solid piece with an aperture. The vibration interface 150 can be configured to securely affix two separate components together in a manner that resists transmission of vibration from one component to the other component. In some embodiments, the vibration interface 150 can be a rubber grommet.

In some embodiments, the majority of the outer surface of the shredder housing 156 can have generally the same surface appearance as the majority of the outer surface of the housing 104. For example, in some embodiments, the majority of the outer surface of the shredder housing 156 can be metallic in appearance and/or the majority of the outer surface of the housing 104 can be metallic in appearance. A majority of the exterior of the shredder housing 156 and/or the housing 104 can comprise stainless steel or aluminum. The shredder housing 156 can be coupled to the top portion 112 of the paper shredder assembly 100. The shredder housing 156 can have an opening 157 to allow for the shredded items to pass through to the receptacle 152.

Figure 4:
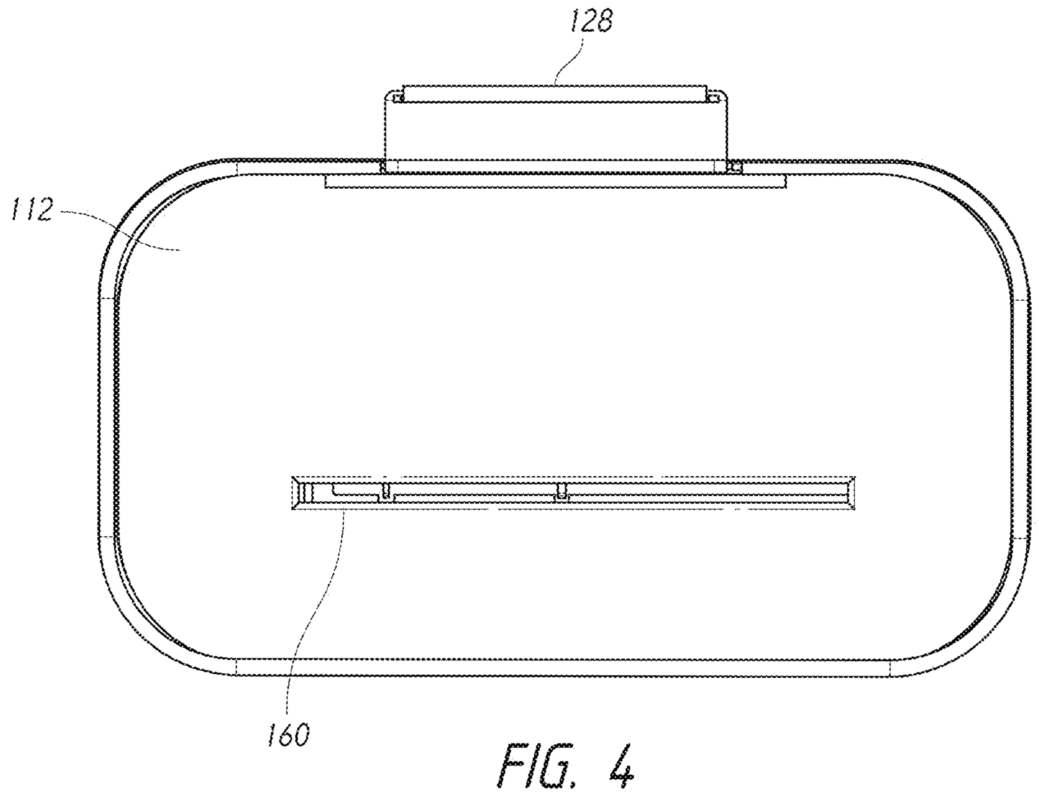
FIG. 4 illustrates a top view of the paper shredder assembly of FIG. 1B with the lid removed.
Figure 5:
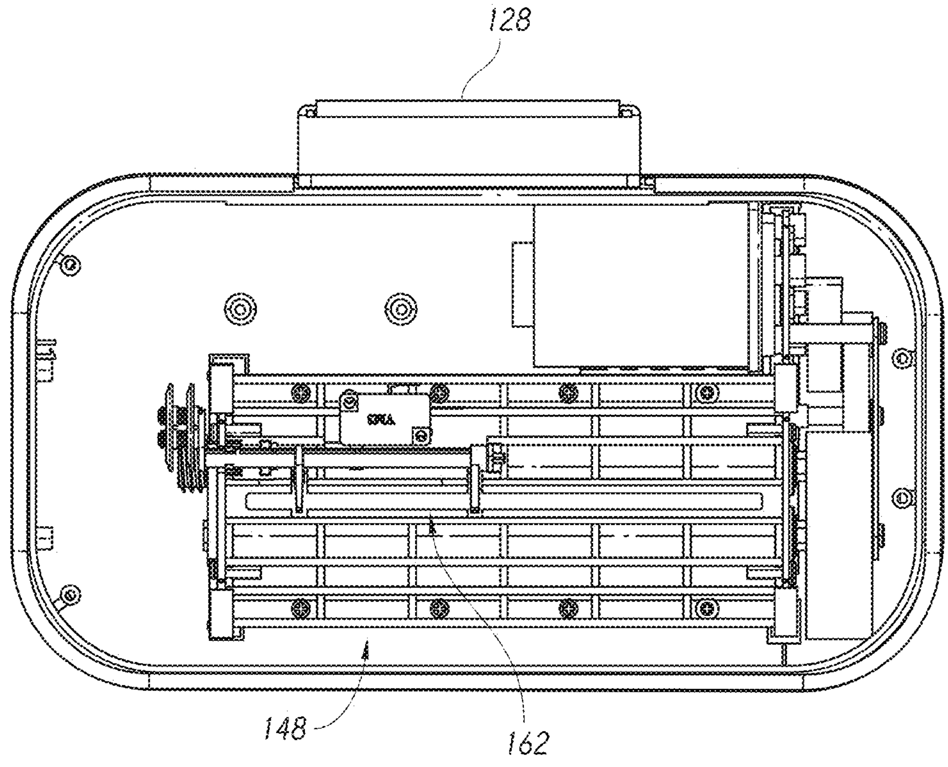
FIG. 5 illustrates a top view of the shredder components of the paper shredder assembly of FIG. 1B.

FIG. 4 illustrates a top view of the paper shredder assembly 100 with the lid 116 removed. The lid 116 is optional. FIG. 5 illustrates a top view of the paper shredder assembly 100 with the top portion 112 removed. The shredder assembly 148 is visible. The top portion 112 can be positioned above the shredder assembly 148. The top portion 112 can be connected to the housing 104. The top portion 112 can include an opening 160. The opening 160 can be configured to receive the items for shredding. The opening 160 can correspond to the overall size of the paper shredder assembly 100. In some embodiments, the size of the opening 160 can be smaller than a standard sheet of paper (e.g., 8.5 inches) because the shredder assembly 148 is sized to be small enough to attach to a lateral side of the receptacle 132 without extending beyond or substantially beyond the front or rear faces of the receptacle 132, which may require that the items to be shredded be modified to fit into the opening, such as by folding. For example, a full size piece of paper may need to be folded in half in order to fit within the opening 160. The opening 160 can be positioned centrally in the top portion 112. The opening 160 can be positioned off center in the top portion 112. The opening 160 can be positioned horizontally depending on the size and shape of the paper shredder assembly 100. The opening 160 can be positioned vertically depending on the size and shape of the paper shredder assembly 100. The items to be shredded can enter the paper shredder assembly 100 through the opening 160 to pass through the corresponding opening 162 in the shredder assembly 148 to pass through the shredder assembly 148 and into the receptacle 152.

Figure 6:
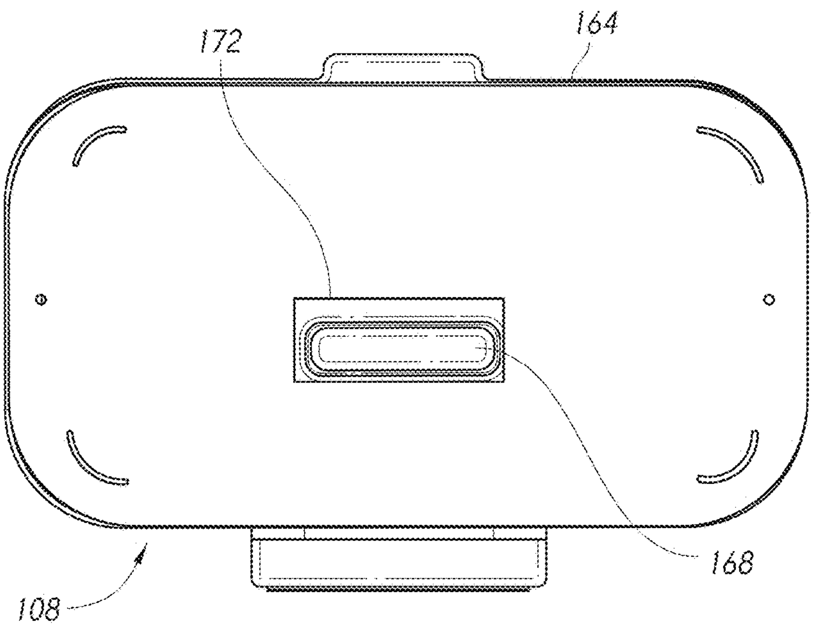
FIG. 6 illustrates a rear view of the paper shredder assembly of FIG. 1B.
Figure 7:
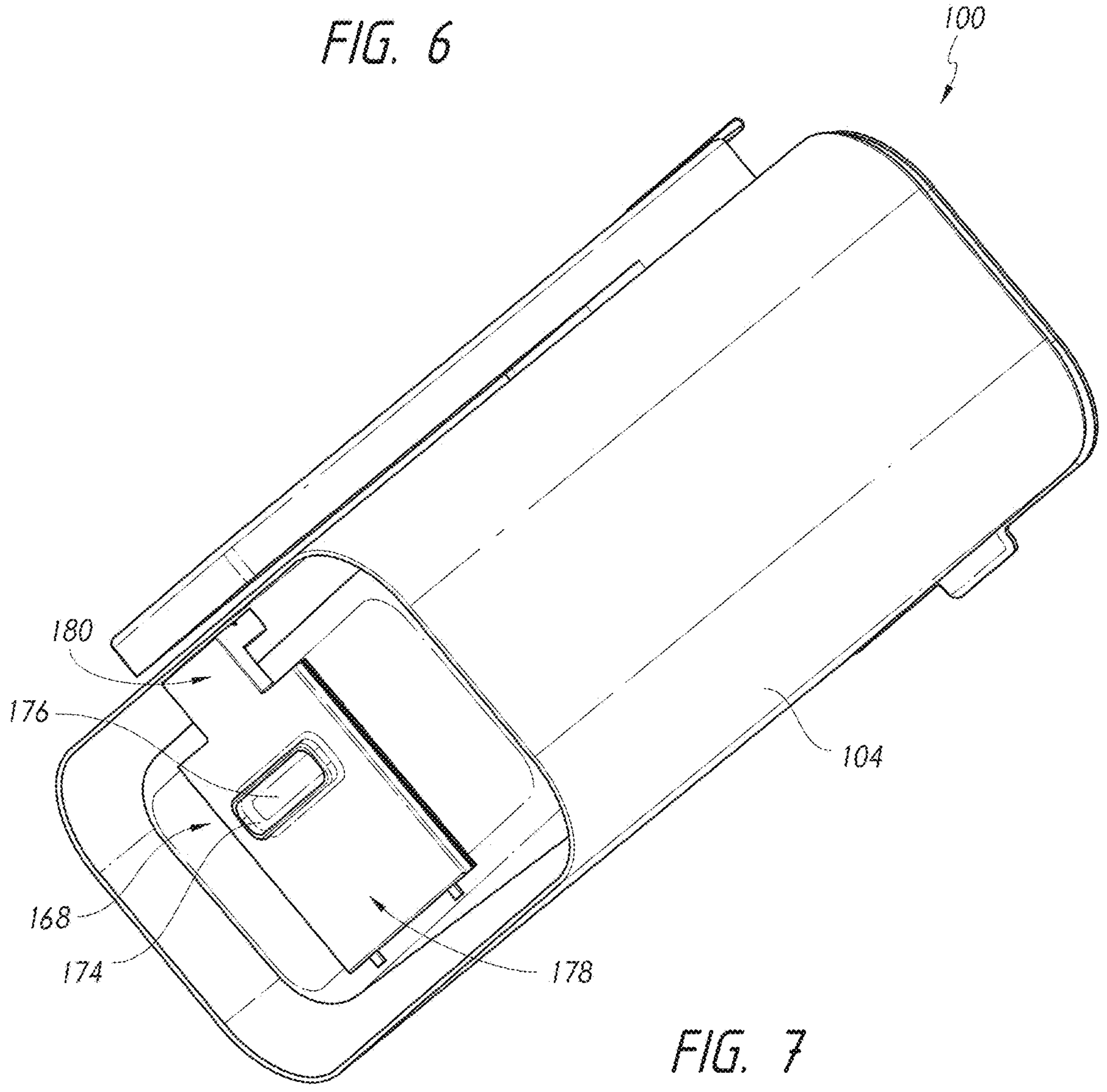
FIG. 7 illustrates a bottom perspective view of the paper shredder assembly of FIG. 1B with a bottom portion of the housing removed.

FIG. 6 illustrates a bottom view of the paper shredder assembly 100. The base portion 108 is visible. The base portion 108 can include a base wall 164. The base portion 108 can include a grip portion 168. FIG. 7 illustrates a bottom perspective view of the paper shredder assembly 100 with the base wall 164 removed. The grip portion 168 can be positioned within an opening 172 of the base wall 164. The grip portion 168 can extend through the opening 172. The grip portion 168 can have a perimeter 174 extending around an indentation 176.

The base portion 108 can include a receptacle support 178. The receptacle 152 can rest on top of the receptacle support 178. The grip portion 168 can be positioned on the bottom side of the receptacle support 178. The receptacle support 178 can be smaller than the base of the receptacle 152. The receptacle support 178 can be generally the same size as the base of the receptacle 152. The receptacle support can have an extension 180 that extends beyond the base of the receptacle 152. The extension 180 can extend toward the rear wall of the housing 104. The extension 180 can extend partially upward between the rear wall of the housing 104 and the receptacle 152.

Figure 8:
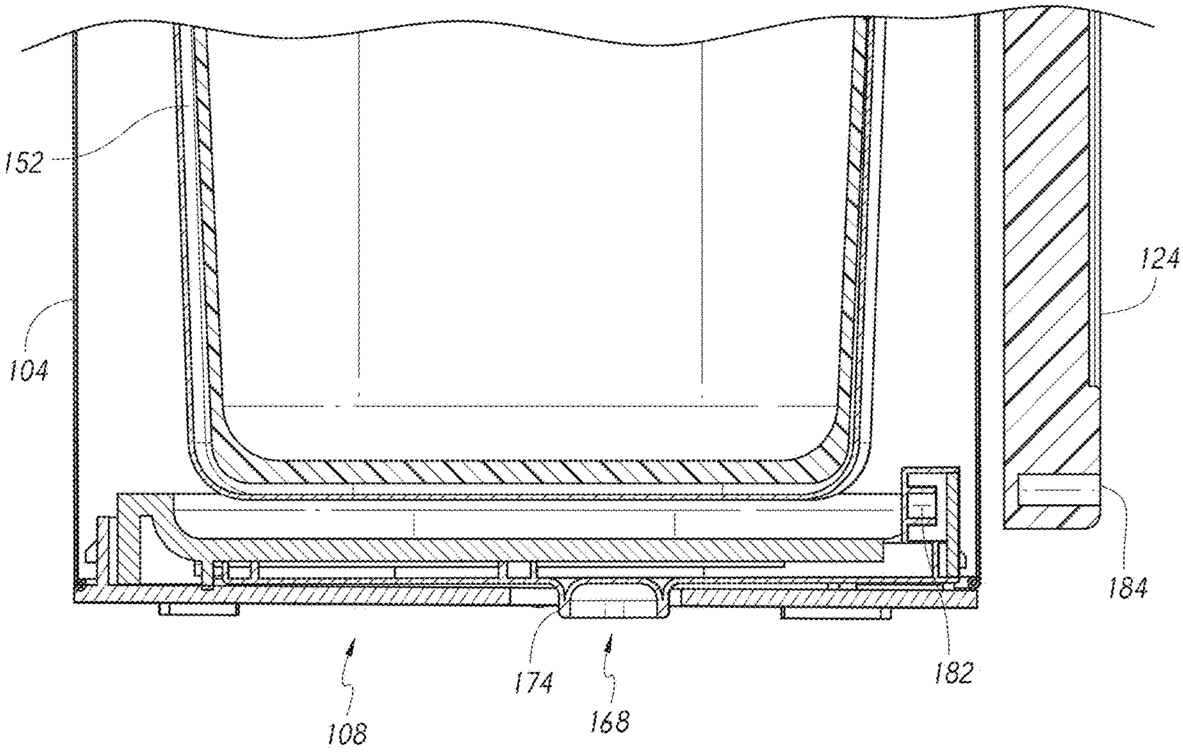
FIG. 8 illustrates a cross-section of a side view of the paper shredder assembly of FIG. 1B.
Figure 9:
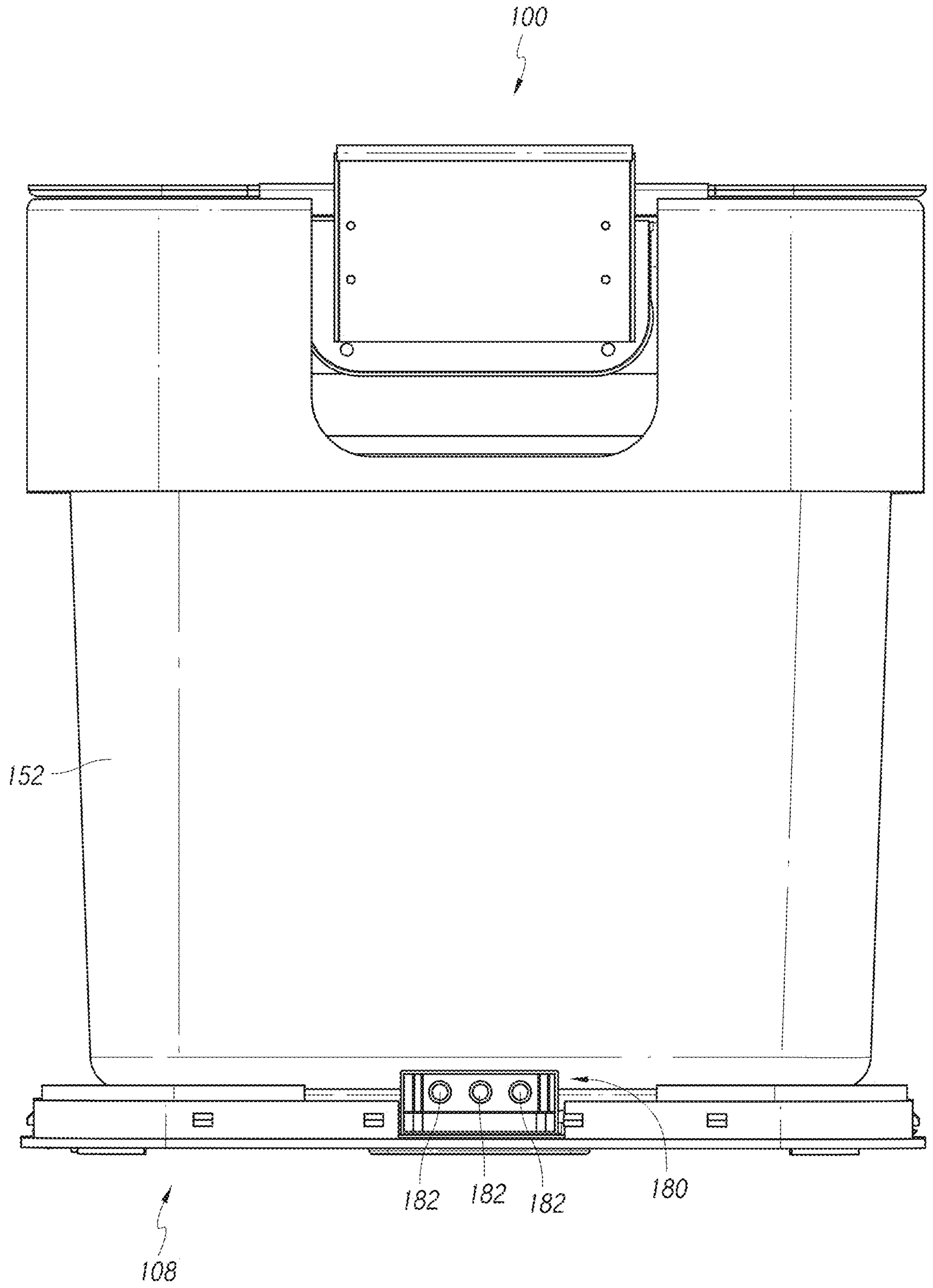
FIG. 9 illustrates a rear view of the paper shredder assembly of FIG. 1B with the housing and hook assembly removed.

A connector can be provided to securely affix the housing 104 to the base portion 108 in a manner that permits easy and convenient detachment or removal by a user without the use of tools. For example, in some embodiments as illustrated, the connector can comprise one or more magnets 182. At least one magnet 182 can be disposed within the extension 180, for example as shown in the cross-section of FIG. 8. Any number of magnets 182 can be used. For example, one, two, three, or more magnets 182 can be used. The magnets 182 can be aligned in a row, for example as shown in FIG. 9 where the housing 104 and hook assembly 120 have been removed. The magnets 182 can be configured to assist in securing the base portion 108 to the housing 104. The magnets 182 can align with magnets 184 disposed within the body portion 124 of the hook assembly 120. In some embodiments, one or more portions of the body portion 124 of the hook assembly 120 can have ferromagnetic properties configured to attract the magnets 182. The housing 104 can include an opening aligned with the magnets 182 to reduce any interference from the housing 104. In some embodiments, the base portion 108 can be sized to fit closely, tightly, and/or securely within the housing 104 to support the receptacle 152.

Figure 10:
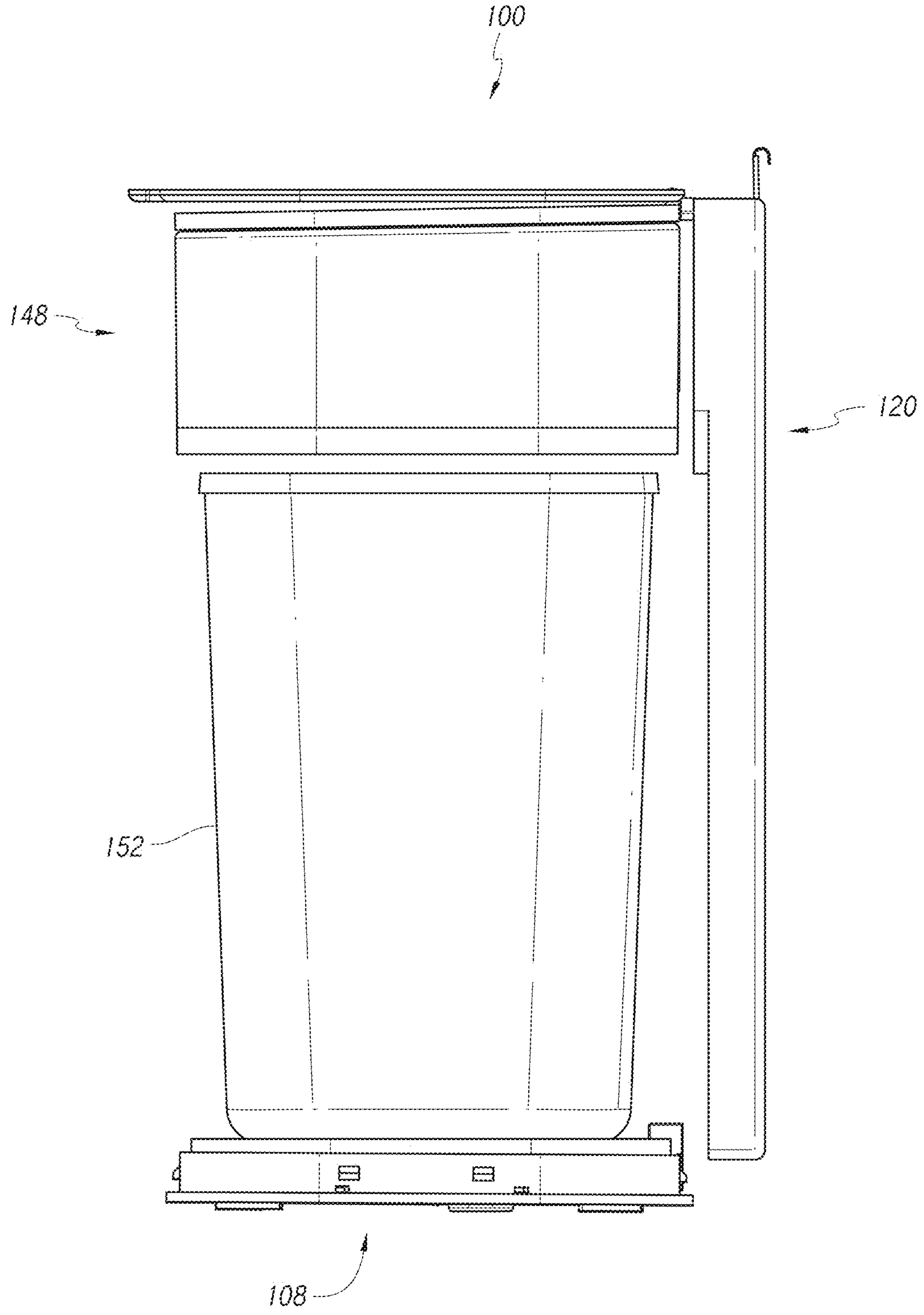
FIG. 10 illustrates a side view of the paper shredder assembly of FIG. 1B with the housing removed.

FIG. 10 illustrates a side view of the paper shredder assembly 100 with the housing 104 removed. The grip portion 168 can assist in removing the receptacle 152 and the base portion 108 from the paper shredder assembly 100. The receptacle 152 can be separate or attached to the base portion 108. The grip portion 168 can be pulled, pushed, moved, or slid to counteract the magnetic force between the magnets 182 and the body portion 124 of the hook assembly 120 and allow the base portion 108 to be removed in a downward motion. In some embodiments, the grip portion 168 can be moved horizontally towards a user to disengage the magnets 182. Removing the base portion 108 will also allow for removal of the receptacle 152. The shredder assembly 148 can stay attached to the paper shredder assembly 100. As shown in FIG. 10, the shredder assembly 148 and the receptacle 152 can be separate.

In some embodiments, the housing 104 can include two removable portions. For example, an upper portion and a lower portion. The lower portion of the housing 104 can be removed along with the base portion 108 and the receptacle 152 via downward movement, as described herein. In some embodiments, the lower portion of the housing 104 can be removed along with the base portion 108 and the receptacle 152 in a horizontal movement.

Figure 11:
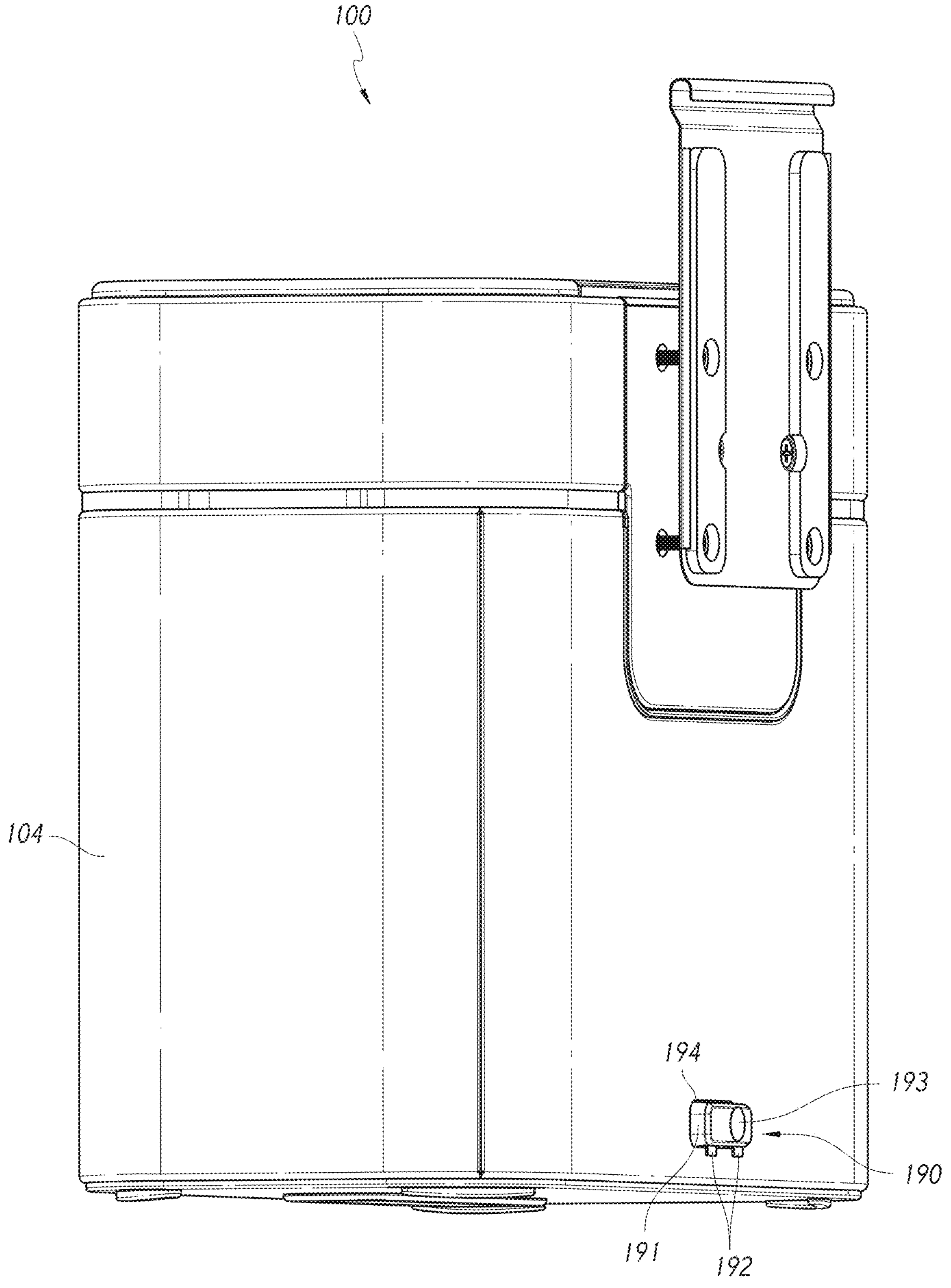
FIG. 11 illustrates a perspective rear view of an embodiment of a paper shredder assembly with a hook assembly removed for illustrative purposes.
Figure 11A:
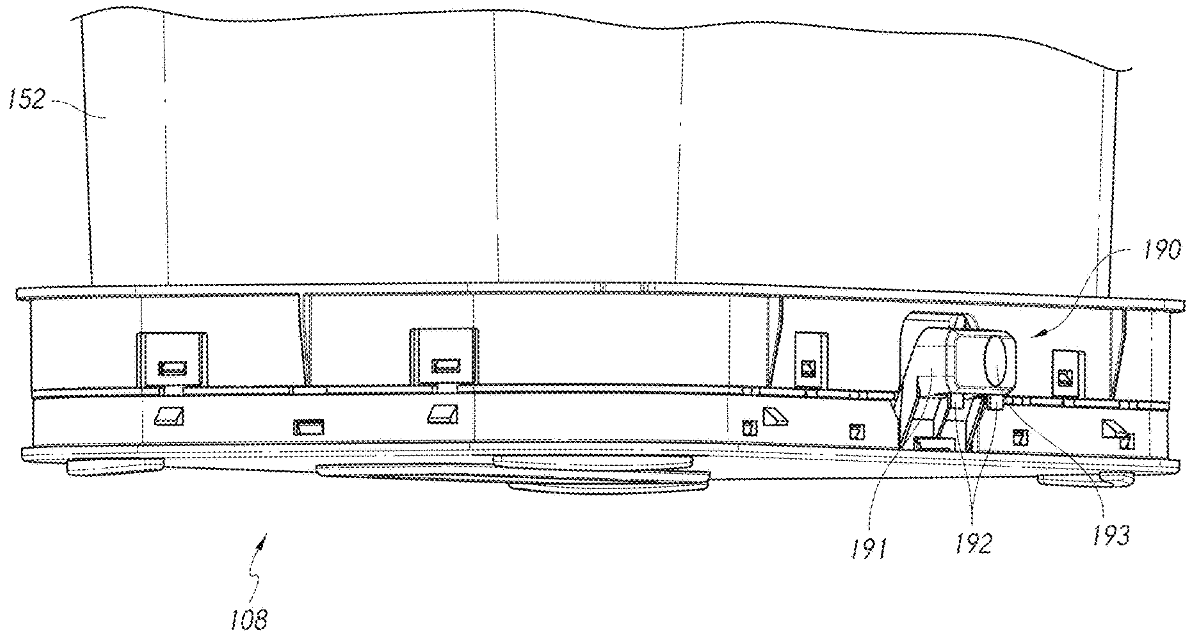
FIG. 11A illustrates an enlarged view of an internal bottom portion of the paper shredder assembly of FIG. 11 with the housing of the paper shredder assembly removed.
Figure 11B:
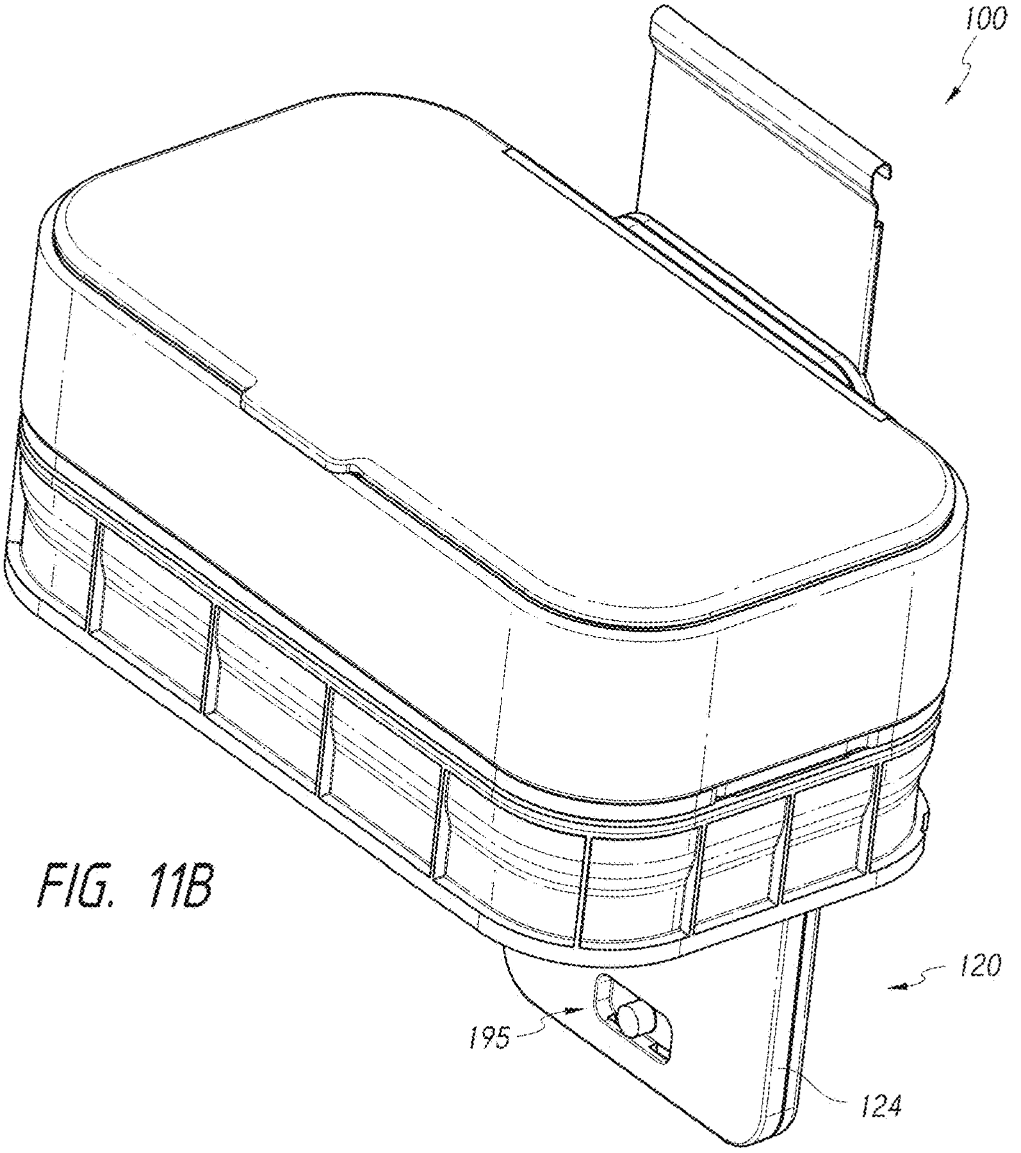
FIG. 11B illustrates a perspective view of the paper shredder assembly of FIG. 11 with the housing and receptacle removed.
Figure 11C:
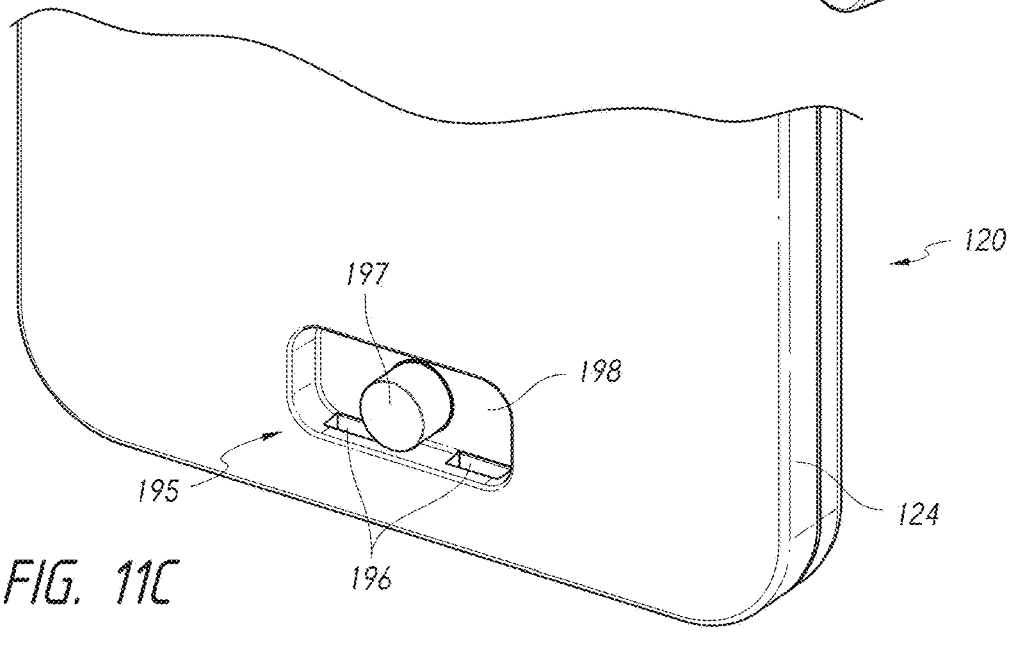
FIG. 11C illustrates a perspective view of a bottom portion of the hook assembly of FIG. 11B.
Figure 11D:
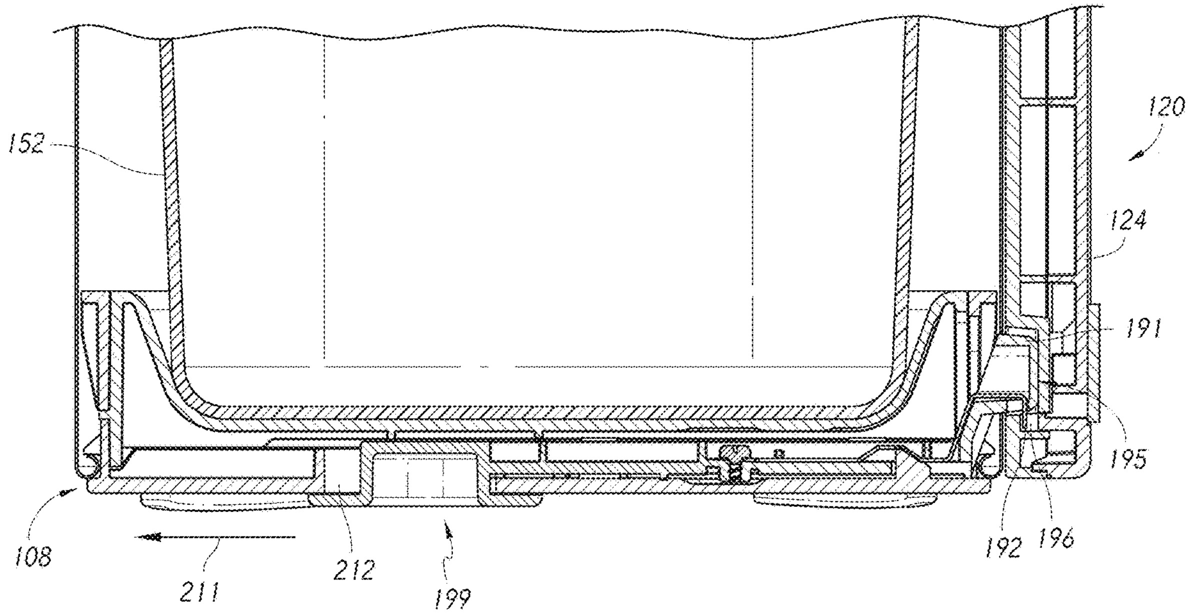
FIG. 11D illustrates a cross-sectional side view of the paper shredder assembly of FIGS. 11A-11C having a coupler removably attaching the housing of the paper shredder assembly and the hook assembly.

FIG. 11-11D illustrate an example embodiment of the paper shredder assembly 100 having a coupler 190. The coupler 190 can assist in securing the base portion 108 to the housing 104 and/or the hook assembly 120. The coupler 190 can be used alone or in combination with another coupler such as the magnets 182, 184 discussed herein.

The coupler 190 can include a moveable part 191. The moveable part 191 can be coupled to the base portion 108 and extend at least partially through an opening 194 of the housing 104, as shown in FIG. 11. The moveable part 191 can have one or more protrusions 192 that extend downward. The moveable part 191 can move between an engaged state (e.g., a state where the coupler 190 is at least partially engaged with the hook assembly 120) and a disengaged state (e.g., a state where the coupler 190 is not engaged with the hook assembly). In some embodiments, the coupler 190 can include a magnet 193 positioned on an attachment or hook assembly facing side of the moveable part 191.

The attachment or hook assembly 120 can include a receiving area 195 configured to receive the moveable part 191. The receiving area 195 can be positioned in the body portion 124 of the hook assembly 120. The receiving area 195 can be a recessed area that extends at least partially into the body portion 124 of the hook assembly 120. The receiving area 195 can include one or more recesses 196 that extend in the direction of the height of the paper shredder assembly 100. The one or more recesses 196 can correspond in size and shape to the one or more protrusions 192 of the coupler 190. In some embodiments, the receiving area 195 can include a magnet 197 that can attract the magnet 193 of the coupler 190. The magnet 197 can protrude toward the housing 104 from a rear wall 198 of the receiving area 195 and/or be positioned on a protrusion that extends toward the housing 104 from the rear wall 198.

The moveable part 191 can be actuated by a grip portion 199. The grip portion 199 can include any of the features described with reference to grip portion 168. The grip portion 199 can assist in removing the receptacle 152 and the base portion 108 from the paper shredder assembly 100. The receptacle 152 can be separate or attached to the base portion 108. The grip portion 199 can be pulled, pushed, moved, or slid to disengage the coupler 190 from the receiving area 195 of the hook assembly and allow the base portion 108 to be removed in a downward motion.

In some embodiments, as shown in FIG. 11D, the grip portion 199 can be moved generally horizontally, in the direction of arrow 211, towards a user to disengage the coupler 190. The grip portion 199 can be positioned in a space 212 that is larger than the grip portion 199 such that grip portion 199 can move within the space 212. The grip portion 199 can be coupled to the moveable portion 191, such that when the grip portion 199 is actuated, the moveable portion 191 and/or the protrusions 192 move upward and disengaged the recesses 196 of the receiving area 195. The grip portion 199 can also assist in disengaging the magnets 193 and 197. The grip portion 199 and/or the moveable part 191 can be biased toward the engaged state, such as with an elastic or resilient spring.

Figure 12:
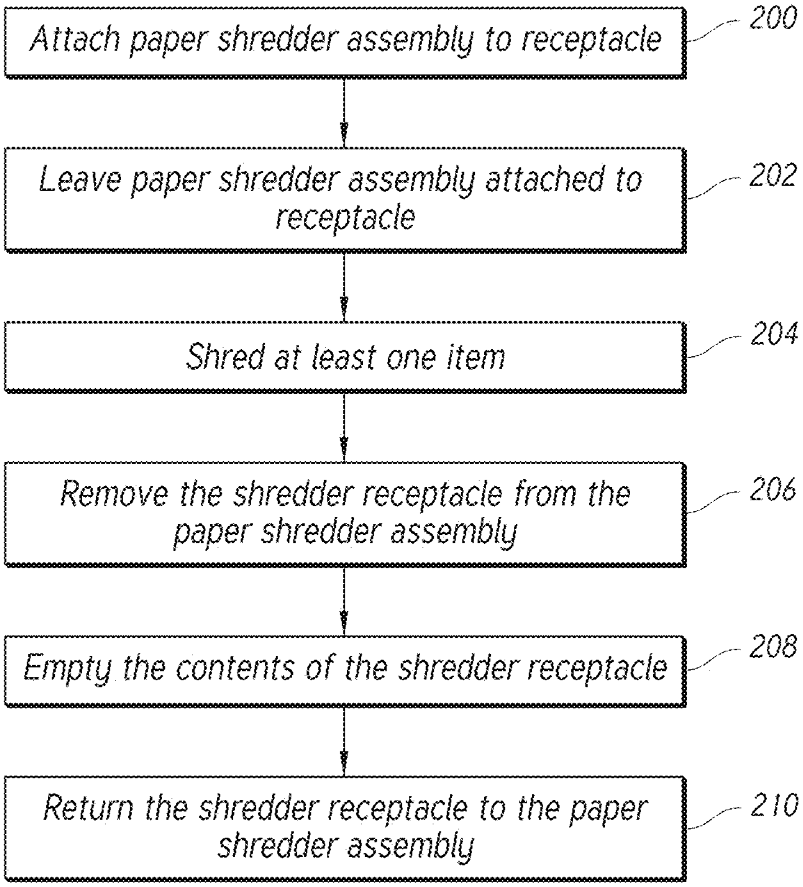
FIG. 12 illustrates an example method of using the paper shredder assembly of FIG. 1B.

FIG. 12 illustrates an example method of using a paper shredder assembly (e.g., paper shredder assembly 100). Starting at block 200 the paper shredder assembly can be attached to a larger receptacle, trash can, recycling container, etc. Moving to block 202 the paper shredder assembly can be left attached to the receptacle for any period of time. Moving to block 204 the paper shredder assembly can be used to shred at least one item. Any number of items can be shred until the receptacle within the shredder assembly is full. Moving to block 206, at any time, even if not yet full, the receptacle within the shredder assembly can be removed from the paper shredder assembly using any method described herein. Moving to block 208, the contents of the shredder receptacle can be emptied. The connection of the paper shredder assembly to a receptacle provides the benefit of being able to empty the contents directly into a larger receptacle without having to travel a distance or to a different room. Moving to block 210, the shredder receptacle can be returned or re-attached to the paper shredder assembly.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "about" and "substantially" as used herein represent an amount close to the stated amount that still performs a desired function or achieves a desired result. For example, in some embodiments as the context may permit, the terms "about" and "substantially" may refer to an amount that is within 10% of the stated amount.

The term "generally" as used herein represents a value, amount, or characteristic that predominantly includes or tends toward a particular value, amount, or characteristic. As an example, in some embodiments as the context may permit, the term "generally perpendicular" can refer to something that departs from exactly perpendicular by less than or equal to 20 degrees.

The ranges disclosed herein also encompass any and all overlap, sub-ranges, and combinations thereof. Language such as "up to," "at least," "greater than," "less than," "between" and the like includes the number recited. Numbers preceded by a term such as "about" or "approximately" include the recited numbers. For example, "about 5 mm" includes "5 mm."

For expository purposes, the term "horizontal" as used herein is defined as a plane parallel to the plane or surface of the floor of the area in which the receptacle assembly or interior container being described is used or the method being described is performed, regardless of its orientation. The term "floor" can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the relative terms "front" and "rear" shall be defined from the perspective of the user opening the receptacle assembly when there is a lid portion. Thus, front refers to the direction of the receptacle closest to the user (e.g., the direction of the pedal or sensor), and rear refers to the direction of the receptacle furthest from the user (e.g., the direction of the connection between the lid portion and the body portion).

Although certain embodiments and examples have been described herein, it will be understood by those skilled in the art that many aspects of the receptacles and bag liner dispensers shown and described in the present disclosure may be differently combined and/or modified to form still further embodiments or acceptable examples. All such modifications and variations are intended to be included herein within the scope of this disclosure. A wide variety of designs and approaches are contemplated. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The following is claimed:

1. A refuse-receiving system comprising:
- a main receptacle that is able to receive whole refuse; and
- a paper shredder comprising:
  - a shredder;
  - a paper shredder receptacle configured to receive shredded refuse from the shredder; and
  - an attachment configured to permit the paper shredder to be removably attached to the main receptacle by a user without the use of tools, such that when the paper shredder is attached to the main receptacle, a user is enabled to insert both whole refuse and shredded refuse in different locations at same time, and the paper shredder is positioned laterally outside an exterior surface of a wall of the main receptacle.

2. The system of claim 1, wherein the paper shredder comprises a housing configured to receive the paper shredder receptacle, the housing comprising a first portion and a second portion, the second portion of the housing being removable from the first portion of the housing.

3. The system of claim 1, wherein the attachment comprises a hook and a body.

4. The system of claim 3, further comprising an adhesive positioned on a first side of the body.

5. The system of claim 3, further comprising a housing configured to receive the paper shredder receptacle, wherein the paper shredder is permanently coupled to the body via the housing.

6. The system of claim 3, wherein the body comprises a groove configured to allow space for a charging cord.

7. The system of claim 1, further comprising:
- a coupler comprising a moveable portion and one or more protrusions
- wherein the attachment comprises a receiving area having one or more recesses configured to receive the one or more protrusions, and
- wherein the paper shredder receptacle is removable from the shredder when the coupler is disengaged.

8. The system of claim 7, wherein the coupler further comprises a magnet.

9. The system of claim 8, wherein the receiving area further comprises a magnet configured to attract the magnet of the coupler.

10. The system of claim 7, further comprising a grip portion configured to disengage the coupler.

11. The system of claim 1, further comprising a lid.

12. The system of claim 1, wherein the attachment further comprises a groove configured to allow space for a charging cord.

13. The system of claim 1, wherein the shredder is coupled to a housing via one or more fasteners, wherein each fastener is at least partially surrounded by a vibration interface.

14. The system of claim 1, wherein the attachment configured to removably attach the paper shredder to a rim of the main receptacle.

15. The system of claim 1, wherein, when the paper shredder is attached to the main receptacle, a top of the paper shredder is positioned adjacent to or in contact with a top of the main receptacle.

* * * * *